(12) United States Patent
Hanneson et al.

(10) Patent No.: US 9,700,171 B2
(45) Date of Patent: Jul. 11, 2017

(54) CAPSULE MACHINE AND COMPONENTS

(71) Applicant: 2266170 Ontario Inc., Mississauga (CA)

(72) Inventors: Scott Jeffrey Hanneson, Mississauga (CA); Thomas Joseph Pfeifer, Louisville, KY (US)

(73) Assignee: 2266170 Ontario Inc., Mississauga (CA)

( * ) Notice: Subject to any disclaimer, the term of this patent is extended or adjusted under 35 U.S.C. 154(b) by 396 days.

(21) Appl. No.: 14/243,925

(22) Filed: Apr. 3, 2014

(65) Prior Publication Data

US 2014/0299000 A1    Oct. 9, 2014

Related U.S. Application Data

(60) Provisional application No. 61/807,887, filed on Apr. 3, 2013, provisional application No. 61/928,446, filed on Jan. 17, 2014.

(51) Int. Cl.
*A47J 31/40* (2006.01)
*A47J 31/46* (2006.01)
(Continued)

(52) U.S. Cl.
CPC .............. *A47J 31/46* (2013.01); *A47J 31/369* (2013.01); *A47J 31/3633* (2013.01);
(Continued)

(58) Field of Classification Search
CPC ................ A47J 31/3633; A47J 31/3638; A47J 31/3676; A47J 31/368; A47J 31/369
(Continued)

(56) References Cited

U.S. PATENT DOCUMENTS

| 2,113,715 A | 4/1938 | Wilcox |
| 2,987,221 A | 6/1961 | Milton |
| (Continued) | | |

FOREIGN PATENT DOCUMENTS

| CA | 2012891 | 9/1991 |
| CA | 2516417 A1 | 9/2004 |
| (Continued) | | |

OTHER PUBLICATIONS

International Search Report and Written Opinion in PCT/CA2014/050332, dated Jun. 18, 2014.

*Primary Examiner* — Reginald L Alexander
(74) *Attorney, Agent, or Firm* — Manelli Selter PLLC; Edward J. Stemberger

(57) ABSTRACT

A machine is provided for preparing a desired product from a capsule containing desired ingredients. The machine includes a brew chamber that is adapted to hold the capsule at a downward angle relative to a horizontal plane. A cover for the brew chamber is adapted to move between an open position and a closed position. A loading mechanism is provided for extending and retracting the brew chamber. An injection system is provided for injecting a fluid into the capsule. A fluid transfer system is provided for transferring a desired fluid from a fluid source to the injection system. A dispensing system is provided for dispensing product to a receptacle. A reusable capsule is also provided for use with the machine.

32 Claims, 26 Drawing Sheets

(51) Int. Cl.
*A47J 31/36* (2006.01)
*A47J 31/56* (2006.01)

(52) U.S. Cl.
CPC .......... *A47J 31/3695* (2013.01); *A47J 31/56* (2013.01); *A47J 31/3676* (2013.01)

(58) Field of Classification Search
USPC ............................................... 99/289 R, 295
See application file for complete search history.

(56) References Cited

U.S. PATENT DOCUMENTS

| | | |
|---|---|---|
| 3,110,121 A | 11/1963 | Corrinet |
| 3,282,703 A | 11/1966 | Broadhurst |
| 3,399,806 A | 9/1968 | Lucas |
| 3,713,936 A | 1/1973 | Ramsay |
| 4,101,627 A | 7/1978 | Menier |
| 4,131,064 A | 12/1978 | Ryan et al. |
| 4,220,673 A | 9/1980 | Strobel |
| 4,235,160 A | 11/1980 | Olney et al. |
| 4,306,367 A | 12/1981 | Otto |
| 4,440,796 A | 4/1984 | Lunder et al. |
| 4,471,689 A | 9/1984 | Piana |
| 4,518,639 A | 5/1985 | Phillips |
| 4,559,729 A | 12/1985 | White |
| 4,619,830 A | 10/1986 | Napier |
| 4,701,365 A | 10/1987 | Iwaski |
| 4,728,425 A | 3/1988 | Sandvig |
| 4,859,337 A | 8/1989 | Woltermann |
| 4,865,737 A | 9/1989 | McMichael |
| 4,867,993 A | 9/1989 | Nordskog |
| 4,975,559 A | 12/1990 | Frisch |
| 4,981,588 A | 1/1991 | Poulallion |
| 4,983,410 A | 1/1991 | Dinos |
| 4,995,310 A | 2/1991 | van der Lijn et al. |
| 4,996,066 A | 2/1991 | Love et al. |
| 5,008,013 A | 4/1991 | Favre et al. |
| 5,076,433 A | 12/1991 | Howes |
| 5,111,740 A | 5/1992 | Klein |
| 5,298,267 A | 3/1994 | Gruenbacher |
| 5,309,820 A | 5/1994 | Baxter et al. |
| 5,325,765 A | 7/1994 | Sylvan et al. |
| 5,331,793 A | 7/1994 | Pophal et al. |
| 5,390,587 A | 2/1995 | Wu |
| 5,447,631 A | 9/1995 | Mahlich |
| 5,456,929 A | 10/1995 | Mifune et al. |
| 5,496,573 A | 3/1996 | Tsuji et al. |
| 5,536,290 A | 7/1996 | Stark et al. |
| 5,575,383 A | 11/1996 | Seeley |
| 5,584,229 A | 12/1996 | Anson |
| 5,601,716 A | 2/1997 | Heinrich et al. |
| 5,605,710 A | 2/1997 | Prindonoff et al. |
| 5,638,740 A | 6/1997 | Cai |
| 5,738,786 A | 4/1998 | Winnington-Ingram |
| 5,806,582 A | 9/1998 | Howes |
| 5,840,189 A | 11/1998 | Sylvan et al. |
| 5,858,437 A | 1/1999 | Anson |
| 5,866,185 A | 2/1999 | Burkett |
| 5,871,096 A | 2/1999 | Yakich |
| 5,871,644 A | 2/1999 | Simon et al. |
| 5,882,716 A | 3/1999 | Munz-Schaerer et al. |
| 5,885,314 A | 3/1999 | Oussoren et al. |
| 5,895,672 A | 4/1999 | Cooper |
| 5,896,686 A | 4/1999 | Howes |
| 5,897,899 A | 4/1999 | Fond |
| 5,923,242 A | 7/1999 | Slagle et al. |
| 5,957,279 A | 9/1999 | Howes |
| 5,971,195 A | 10/1999 | Reidinger et al. |
| 6,025,000 A | 2/2000 | Fond et al. |
| 6,079,315 A | 6/2000 | Beaulieu et al. |
| 6,082,247 A | 7/2000 | Beaulieu |
| 6,142,063 A | 11/2000 | Beaulieu et al. |
| 6,146,270 A | 11/2000 | Huard et al. |
| 6,182,554 B1 | 2/2001 | Beaulieu et al. |
| 6,189,438 B1 | 2/2001 | Bielfeldt et al. |
| 6,220,147 B1 | 4/2001 | Priley |
| 6,223,937 B1 | 5/2001 | Schmidt |
| 6,440,256 B1 | 8/2002 | Gordon et al. |
| 6,514,555 B1 | 2/2003 | Fayard et al. |
| 6,548,433 B1 | 4/2003 | Gbur et al. |
| 6,557,597 B2 | 5/2003 | Riesterer |
| 6,561,232 B1 | 5/2003 | Frutin |
| 6,589,577 B2 | 7/2003 | Lazaris et al. |
| 6,606,938 B2 | 8/2003 | Taylor |
| 6,607,762 B2 | 8/2003 | Lazaris et al. |
| 6,622,615 B2 | 9/2003 | Heczko |
| 6,644,173 B2 | 11/2003 | Lazaris et al. |
| 6,645,537 B2 | 11/2003 | Sweeney et al. |
| 6,655,260 B2 | 12/2003 | Lazaris et al. |
| 6,658,989 B2 | 12/2003 | Sweeney et al. |
| 6,666,130 B2 | 12/2003 | Taylor et al. |
| 6,672,200 B2 | 1/2004 | Duffy et al. |
| 6,698,333 B2 | 3/2004 | Halliday et al. |
| 6,708,600 B2 | 3/2004 | Winkler et al. |
| 6,720,070 B2 | 4/2004 | Hamaguchi et al. |
| 6,758,130 B2 | 7/2004 | Sargent et al. |
| 6,810,788 B2 | 11/2004 | Hale |
| 6,841,185 B2 | 1/2005 | Sargent et al. |
| 6,854,378 B2 | 2/2005 | Jarisch et al. |
| 6,869,627 B2 | 3/2005 | Perkovic et al. |
| 6,913,777 B2 | 7/2005 | Rebhorn et al. |
| 6,955,116 B2 | 10/2005 | Hale |
| 6,959,832 B1 | 11/2005 | Sawada |
| 6,966,251 B2 | 11/2005 | Yaokim |
| 6,992,586 B2 | 1/2006 | Rosenfeld |
| 7,017,472 B2 | 3/2006 | Grant |
| 7,024,983 B2 | 4/2006 | Grant |
| 7,047,870 B2 | 5/2006 | Gantt et al. |
| 7,063,238 B2 | 6/2006 | Hale |
| 7,067,038 B2 | 6/2006 | Trokhan et al. |
| 7,093,533 B2 | 8/2006 | Tebo, Jr. et al. |
| 7,153,530 B2 | 12/2006 | Masek et al. |
| 7,165,488 B2 | 1/2007 | Bragg et al. |
| 7,178,453 B2 | 2/2007 | In Albon |
| 7,216,582 B2 * | 5/2007 | Yoakim ............... A47J 31/0668 99/289 R |
| 7,279,188 B2 | 10/2007 | Arrick et al. |
| 7,311,209 B2 | 12/2007 | Bentz et al. |
| 7,328,651 B2 | 2/2008 | Halliday et al. |
| 7,335,387 B2 | 2/2008 | Hayes et al. |
| 7,347,138 B2 | 3/2008 | Bragg et al. |
| 7,360,418 B2 | 4/2008 | Pelovitz |
| 7,377,162 B2 | 5/2008 | Lazaris |
| 7,387,063 B2 | 6/2008 | Vu et al. |
| 7,398,726 B2 | 7/2008 | Streeter et al. |
| 7,412,921 B2 | 8/2008 | Hu et al. |
| 7,469,628 B2 | 12/2008 | Mandralis et al. |
| 7,490,542 B2 | 2/2009 | Macchi et al. |
| 7,513,192 B2 * | 4/2009 | Sullivan ............... A47J 31/3695 99/279 |
| 7,523,695 B2 | 4/2009 | Streeter et al. |
| 7,543,527 B2 | 6/2009 | Schmed |
| 7,552,672 B2 | 6/2009 | Schmed |
| 7,552,673 B2 | 6/2009 | Levin |
| 7,594,470 B2 | 9/2009 | Scarchilli et al. |
| 7,624,673 B2 | 12/2009 | Zanetti |
| 7,640,842 B2 | 1/2010 | Bardazzi |
| 7,640,845 B2 | 1/2010 | Woodnorth et al. |
| 7,681,492 B2 | 3/2010 | Suggi et al. |
| 7,685,930 B2 | 3/2010 | Mandralis et al. |
| 7,763,300 B2 | 7/2010 | Sargent et al. |
| 7,798,055 B2 | 9/2010 | Mandralis et al. |
| 7,832,328 B2 | 11/2010 | Koeling et al. |
| 7,836,818 B2 | 11/2010 | Noordhuis |
| 7,854,192 B2 | 12/2010 | Denisart et al. |
| 7,856,919 B2 | 12/2010 | Van Belleghem |
| 7,856,920 B2 | 12/2010 | Schmed et al. |
| 7,856,921 B2 | 12/2010 | Arrick et al. |
| 7,910,145 B2 | 3/2011 | Reati |
| 7,930,972 B2 | 4/2011 | Denisart et al. |
| 7,946,217 B2 | 5/2011 | Favre et al. |
| 7,958,815 B2 | 6/2011 | Kodden et al. |
| 8,062,682 B2 | 11/2011 | Mandralis et al. |
| 8,163,318 B2 | 4/2012 | Ozanne et al. |

(56) References Cited

U.S. PATENT DOCUMENTS

| | | |
|---|---|---|
| 8,176,840 B2 | 5/2012 | Jarisch |
| 8,210,097 B2 | 7/2012 | Versini |
| 8,225,708 B2 | 7/2012 | Lassota et al. |
| 8,225,771 B2 | 7/2012 | Andre |
| 8,225,961 B2 | 7/2012 | Anson |
| 8,230,776 B2 | 7/2012 | Chen et al. |
| 8,252,351 B2 | 8/2012 | Ozanne |
| 8,261,656 B2 | 9/2012 | Nijboer et al. |
| 8,286,547 B1 | 10/2012 | Lassota |
| 8,361,527 B2 | 1/2013 | Winkler et al. |
| 8,367,133 B2 | 2/2013 | Keller |
| 8,409,646 B2 | 4/2013 | Yoakim et al. |
| 8,418,602 B2 | 4/2013 | Magg et al. |
| 8,425,957 B2 | 4/2013 | Steenhof |
| 8,425,963 B2 | 4/2013 | Ryser |
| 8,431,175 B2 | 4/2013 | Yoakim |
| 8,443,718 B2 | 5/2013 | Denisart et al. |
| 8,445,047 B2 | 5/2013 | Ozanne |
| 8,453,560 B2 | 6/2013 | Coccia et al. |
| 8,474,368 B2 | 7/2013 | Kilber et al. |
| 8,475,854 B2 | 7/2013 | Skalski et al. |
| 8,481,097 B2 | 7/2013 | Skalski et al. |
| 8,573,114 B2 | 11/2013 | Huang et al. |
| 8,591,978 B2 | 11/2013 | Skalski et al. |
| 8,673,379 B2 | 3/2014 | Skalski et al. |
| 8,740,020 B2 | 6/2014 | Marina et al. |
| 8,834,948 B2 | 9/2014 | Estabrook et al. |
| 8,881,643 B2 * | 11/2014 | Baldo ............... A47J 31/3685 99/289 R |
| 8,960,078 B2 | 2/2015 | Hristov et al. |
| 2002/0002913 A1 * | 1/2002 | Mariller ............ A47J 31/3633 99/495 |
| 2002/0020659 A1 | 2/2002 | Sweeney et al. |
| 2003/0005826 A1 | 1/2003 | Sargent et al. |
| 2003/0039731 A1 | 2/2003 | Dalton et al. |
| 2003/0087005 A1 | 5/2003 | Baron |
| 2003/0155101 A1 | 8/2003 | Minney |
| 2005/0016383 A1 | 1/2005 | Kirschner et al. |
| 2005/0051478 A1 | 3/2005 | Karanikos et al. |
| 2005/0287251 A1 | 12/2005 | Lazaris et al. |
| 2006/0000364 A1 | 1/2006 | Lau et al. |
| 2006/0236871 A1 | 10/2006 | Ternite et al. |
| 2006/0246187 A1 | 11/2006 | Egolf et al. |
| 2007/0068394 A1 | 3/2007 | Jarisch et al. |
| 2007/0144356 A1 | 6/2007 | Rivera |
| 2007/0148290 A1 | 6/2007 | Ternite |
| 2007/0275125 A1 | 11/2007 | Catani |
| 2007/0292584 A1 | 12/2007 | Arrick et al. |
| 2008/0015098 A1 | 1/2008 | Littlejohn et al. |
| 2008/0095904 A1 | 4/2008 | Sullivan et al. |
| 2008/0115674 A1 | 5/2008 | Huang et al. |
| 2008/0115675 A1 | 5/2008 | Suggi Liuerani et al. |
| 2008/0134902 A1 | 6/2008 | Zimmerman et al. |
| 2008/0142115 A1 | 6/2008 | Vogt et al. |
| 2008/0156196 A1 | 7/2008 | Doglioni et al. |
| 2008/0202075 A1 | 8/2008 | Kronawittleithner et al. |
| 2008/0245236 A1 | 10/2008 | Ternite et al. |
| 2009/0110775 A1 | 4/2009 | Rijskamp et al. |
| 2009/0133584 A1 | 5/2009 | De Graaff et al. |
| 2009/0165228 A1 | 7/2009 | Kilkenny |
| 2009/0175986 A1 | 7/2009 | Doglioni Majer |
| 2009/0186141 A1 | 7/2009 | Almblad et al. |
| 2009/0199518 A1 | 8/2009 | Deuber et al. |
| 2009/0206084 A1 | 8/2009 | Woolf et al. |
| 2009/0211458 A1 | 8/2009 | Denisart et al. |
| 2009/0260690 A1 | 10/2009 | Bell |
| 2009/0311389 A1 | 12/2009 | Zoss et al. |
| 2009/0317518 A1 | 12/2009 | York et al. |
| 2009/0324791 A1 | 12/2009 | Ohresser et al. |
| 2010/0003379 A1 | 1/2010 | Zoss et al. |
| 2010/0024658 A1 | 2/2010 | Jacobs et al. |
| 2010/0028495 A1 | 2/2010 | Novak et al. |
| 2010/0083843 A1 | 4/2010 | Denisart et al. |
| 2010/0116772 A1 | 5/2010 | Teys |
| 2010/0147873 A1 * | 6/2010 | Tanner ............ A47J 31/4492 99/295 |
| 2010/0215808 A1 | 8/2010 | Versini |
| 2010/0239733 A1 | 9/2010 | Yoakim et al. |
| 2010/0260908 A1 | 10/2010 | Denisart et al. |
| 2010/0263545 A1 | 10/2010 | Morgan et al. |
| 2010/0303964 A1 | 12/2010 | Beaulieu et al. |
| 2011/0000377 A1 | 1/2011 | Favre |
| 2011/0003040 A1 | 1/2011 | Graf et al. |
| 2011/0011273 A1 | 1/2011 | Evers et al. |
| 2011/0017072 A1 | 1/2011 | Frigeri et al. |
| 2011/0033580 A1 | 2/2011 | Bieshuevel et al. |
| 2011/0045144 A1 | 2/2011 | Boussemart et al. |
| 2011/0076361 A1 | 3/2011 | Peterson et al. |
| 2011/0151075 A1 | 6/2011 | Peterson |
| 2011/0183048 A1 | 7/2011 | Noble et al. |
| 2011/0185911 A1 | 8/2011 | Rapparini |
| 2011/0189350 A1 | 8/2011 | Van Belleghem |
| 2011/0200726 A1 | 8/2011 | Tinkler et al. |
| 2011/0226343 A1 | 9/2011 | Novak et al. |
| 2011/0247975 A1 | 10/2011 | Rapparini |
| 2012/0000371 A1 | 1/2012 | Blanchino |
| 2012/0006205 A1 | 1/2012 | Vanni |
| 2012/0024160 A1 | 2/2012 | Van et al. |
| 2012/0052163 A1 | 3/2012 | Doleac et al. |
| 2012/0060698 A1 | 3/2012 | Baldo et al. |
| 2012/0070542 A1 | 3/2012 | Camera et al. |
| 2012/0073418 A1 | 3/2012 | Aardenburg |
| 2012/0097602 A1 | 4/2012 | Tedford |
| 2012/0100259 A1 | 4/2012 | Rapparini |
| 2012/0121764 A1 | 5/2012 | Lai et al. |
| 2012/0171332 A1 | 7/2012 | Lai et al. |
| 2012/0171334 A1 | 7/2012 | Yoakim |
| 2012/0174794 A1 | 7/2012 | Fraij |
| 2012/0180669 A1 | 7/2012 | Lovalvo et al. |
| 2012/0180670 A1 | 7/2012 | Yoakim |
| 2012/0180671 A1 | 7/2012 | Baudet |
| 2012/0183649 A1 | 7/2012 | Burkhalter |
| 2012/0186457 A1 | 7/2012 | Ozanne |
| 2012/0196008 A1 | 8/2012 | York |
| 2012/0199007 A1 | 8/2012 | Larzul |
| 2012/0199010 A1 | 8/2012 | Mariller |
| 2012/0199011 A1 | 8/2012 | Cheng |
| 2012/0201933 A1 | 8/2012 | Dran et al. |
| 2012/0201937 A1 | 8/2012 | Marabi et al. |
| 2012/0207893 A1 | 8/2012 | Kreuger |
| 2012/0207894 A1 | 8/2012 | Webster |
| 2012/0210876 A1 | 8/2012 | Glucksman |
| 2012/0210878 A1 | 8/2012 | Mariller |
| 2012/0210879 A1 | 8/2012 | Mariller |
| 2012/0231123 A1 | 9/2012 | Kamerbeek |
| 2012/0231124 A1 | 9/2012 | Kamerbeek |
| 2012/0231126 A1 | 9/2012 | Lo Faro |
| 2012/0231133 A1 | 9/2012 | Kamerbeek |
| 2012/0251668 A1 | 10/2012 | Wong |
| 2012/0251669 A1 | 10/2012 | Kamerbeek |
| 2012/0251670 A1 | 10/2012 | Kamerbeek |
| 2012/0251671 A1 | 10/2012 | Kamerbeek |
| 2012/0251692 A1 | 10/2012 | Kamerbeek |
| 2012/0251693 A1 | 10/2012 | Kamerbeek |
| 2012/0251694 A1 | 10/2012 | Kamerbeek |
| 2012/0258204 A1 | 10/2012 | Tsuji |
| 2012/0258210 A1 | 10/2012 | Wong |
| 2012/0258219 A1 | 10/2012 | Wong |
| 2012/0258221 A1 | 10/2012 | Wong |
| 2012/0260806 A1 | 10/2012 | Rolfes |
| 2012/0263829 A1 | 10/2012 | Kamerbeek |
| 2012/0263830 A1 | 10/2012 | Kamerbeek |
| 2012/0263833 A1 | 10/2012 | Wong |
| 2012/0266755 A1 | 10/2012 | Baudet |
| 2012/0269933 A1 | 10/2012 | Rapparini |
| 2012/0272830 A1 | 11/2012 | Gugerli |
| 2012/0276252 A1 | 11/2012 | Bunke |
| 2012/0276255 A1 | 11/2012 | Verbeek |
| 2012/0295001 A1 | 11/2012 | Nijboer et al. |
| 2012/0297987 A1 | 11/2012 | Lee |
| 2012/0301581 A1 | 11/2012 | Abegglen |
| 2012/0307024 A1 | 12/2012 | Howes |
| 2012/0308688 A1 | 12/2012 | Peterson |

(56) References Cited

U.S. PATENT DOCUMENTS

| | | |
|---|---|---|
| 2012/0312174 A1 | 12/2012 | Lambert |
| 2012/0321755 A1 | 12/2012 | Macaulay |
| 2012/0321756 A1 | 12/2012 | Estabrook et al. |
| 2012/0328739 A1 | 12/2012 | Nocera |
| 2012/0328740 A1 | 12/2012 | Nocera |
| 2012/0328744 A1 | 12/2012 | Nocera |
| 2013/0004629 A1 | 1/2013 | Clark |
| 2013/0004637 A1 | 1/2013 | Gugerli |
| 2013/0008316 A1 | 1/2013 | Hoeglauer |
| 2013/0011521 A1 | 1/2013 | Weijers et al. |
| 2013/0017303 A1 | 1/2013 | Vu |
| 2013/0025466 A1 | 1/2013 | Fu |
| 2013/0032034 A1 | 2/2013 | Jarisch |
| 2013/0047863 A1 | 2/2013 | Larzul |
| 2013/0059039 A1 | 3/2013 | Trombetta |
| 2013/0059903 A1 | 3/2013 | Deuber |
| 2013/0061762 A1 | 3/2013 | Carr et al. |
| 2013/0064948 A1 | 3/2013 | Ozanne et al. |
| 2013/0068109 A1 | 3/2013 | Pribus et al. |
| 2013/0084368 A1 | 4/2013 | Linck et al. |
| 2013/0095219 A1 | 4/2013 | de Graaff et al. |
| 2013/0112082 A1 | 5/2013 | Baldo et al. |
| 2013/0115342 A1 | 5/2013 | Van et al. |
| 2013/0122153 A1 | 5/2013 | Ferrier et al. |
| 2013/0122167 A1 | 5/2013 | Winkler et al. |
| 2013/0129886 A1 | 5/2013 | Quinn et al. |
| 2013/0142931 A1 | 6/2013 | Fin et al. |
| 2013/0149424 A1 | 6/2013 | Fisher |
| 2013/0259982 A1 | 10/2013 | Abegglen et al. |
| 2013/0340626 A1 | 12/2013 | Oh |
| 2013/0344205 A1 | 12/2013 | Oh |
| 2014/0013958 A1 | 1/2014 | Krasne et al. |
| 2014/0037802 A1 | 2/2014 | Cardoso |
| 2014/0099388 A1 | 4/2014 | Wang et al. |
| 2015/0050391 A1 | 2/2015 | Rapparini |
| 2015/0068403 A1* | 3/2015 | Bentley ................. A47J 31/44 99/284 |
| 2015/0068404 A1* | 3/2015 | Rivera ................. A47J 31/0678 99/285 |
| 2015/0164262 A1* | 6/2015 | Dingle ................. A47J 31/3633 99/295 |
| 2015/0223630 A1* | 8/2015 | Reimondo ........... A47J 31/3633 426/425 |

FOREIGN PATENT DOCUMENTS

| | | |
|---|---|---|
| CA | 2689804 A1 | 3/2008 |
| CA | 2686347 A1 | 12/2008 |
| CA | 2807489 A1 | 2/2012 |
| CA | 2824199 A1 | 8/2012 |
| CA | 2759782 A1 | 11/2012 |
| CA | 2801236 A1 | 3/2013 |
| EP | 0047169 A2 | 3/1982 |
| EP | 0145499 | 6/1985 |
| EP | 0432126 A1 | 6/1991 |
| EP | 1767129 | 3/2007 |
| EP | 1859683 | 11/2007 |
| EP | 2230195 | 9/2010 |
| EP | 2471420 | 7/2012 |
| FR | 2930522 A1 | 10/2009 |
| GB | 803486 A | 10/1958 |
| GB | 962038 | 6/1964 |
| GB | 2074838 | 11/1981 |
| JP | 662737 | 3/1994 |
| JP | 11171249 A | 6/1999 |
| WO | 0145616 A1 | 6/2001 |
| WO | 0245559 | 6/2002 |
| WO | 03082065 A1 | 10/2003 |
| WO | 2004083071 A1 | 9/2004 |
| WO | 2008023057 | 2/2008 |
| WO | 2009114119 | 9/2009 |
| WO | 2010013146 A2 | 2/2010 |
| WO | 2010066705 A1 | 6/2010 |
| WO | 2010085824 | 8/2010 |
| WO | 2010006516 A1 | 9/2010 |
| WO | 2010137956 A1 | 12/2010 |
| WO | 2011045175 | 4/2011 |
| WO | 2011078841 | 6/2011 |
| WO | 2011095518 | 8/2011 |
| WO | 2012031106 A1 | 3/2012 |
| WO | 2012069505 | 5/2012 |

\* cited by examiner

CAPSULE MACHINE AND COMPONENTS

FIELD

This specification relates to machines and machine components for preparing products such as beverages from single serve capsules.

BACKGROUND

The following background discussion is not an admission that anything discussed below is citable as prior art or common general knowledge. The documents listed below are incorporated herein in their entirety by this reference to them.

Single serve capsules for use in beverage preparing machines are becoming increasingly popular. Such capsules come in a variety of formats for producing beverages such as espresso coffee, drip coffee, tea, hot chocolate or soup broth.

There are two primary categories of beverage preparing machines; (i) high pressure machines typically used for preparing espresso and (ii) low pressure machines typically used for preparing drip coffee (filtered coffee), tea or hot chocolate.

Low pressure machines typically include a brew chamber that supports the capsule while a fluid (typically hot or cold water) is injected into a chamber within the capsule containing ingredients for preparing the beverage (such as ground roasted coffee). The fluid flows through the chamber and typically through a filter prior to being dispensed by piercing a lower portion of the capsule to permit the prepared beverage to flow into a user's cup.

One problem with conventional beverage preparing machines is that the cover of the brew chamber tends to partially impede easy access for loading and removing capsules.

Another problem with conventional beverage preparing machines is that the orientation of the brew chamber and the fluid injection nozzle does not provide for optimum mixing and saturation of the beverage ingredients.

Another problem with conventional beverage preparing machines is that the orientation of the brew chamber and the dispensing probe does not provide for optimum dispensing of the prepared beverage from the capsule.

Another problem with conventional beverage preparing machines is that the plumbing is not adapted for providing a mix of hot and cold or ambient fluid to the injection nozzle.

Another problem with conventional beverage preparing machines is that they do not have the ability to introduce air into the capsule independently of the brewing sequence in order to produce additional foam or crema or to otherwise modify the beverage characteristics where this may be desirable.

Another problem with conventional beverage preparing machines is that they do not provide the user with the ability to "top up" their beverage by dispensing an additional volume of beverage following the completion of the brewing sequence.

Another problem with conventional beverage preparing machines is that they are not provided with a re-useable capsule configured to work with a fluid inlet nozzle that is offset from the central axis of the capsule to optimize the mixing and wetting of the beverage ingredients.

There is a need for a machine that overcomes the problems with conventional beverage preparing machines such as one or more of the problems identified above.

SUMMARY

In one aspect the invention provides a machine for preparing a product from a capsule that contains desired ingredients, the machine comprising:
a housing;
a brew chamber disposed in said housing, said brew chamber being adapted for holding a capsule;
a cover adapted for covering said brew chamber, said cover being moveable between an open position, for loading or unloading a capsule, and a closed position for preparing a beverage;
an injection system adapted for injecting a fluid into said capsule when said cover is in said closed position;
a fluid transfer system adapted for transferring a desired fluid from a fluid source to said injection system; and
a dispensing system adapted for dispensing product from said capsule to a desired receptacle.

In another aspect the invention provides a reusable capsule for a machine adapted to receive the capsule, said reusable capsule comprising:
a) a body sized to fit within a brew chamber of the machine, said body having a side wall extending from an end wall to an opening to define an interior space for receiving ingredients for preparing a desired product;
b) a cover removably disposed over said opening, said cover including an inlet adapted for receiving an injection nozzle from the machine; and
c) at least one opening defined in said body;
wherein said body is adapted to receive a filter in said interior space for filtering said ingredients during preparation of a desired product.

In another aspect the invention provides a machine for preparing a product from a capsule that contains desired ingredients, the machine comprising:
a housing;
a brew chamber disposed in said housing, said brew chamber being adapted for holding a capsule wherein said brew chamber is adapted to hold said capsule at a downward angle relative to a horizontal plane;
a cover adapted for covering said brew chamber, said cover being moveable between an open position, for loading or unloading a capsule, and a closed position for preparing a beverage;
a loading mechanism adapted for extending said brew chamber away from said housing, for loading or unloading said capsule, and retracting said brew chamber toward said housing, for preparing said beverage;
an injection system adapted for injecting a fluid into said capsule when said cover is in said closed position;
a fluid transfer system adapted for transferring a desired fluid from a fluid source to said injection system; and
a dispensing system adapted for dispensing product from said capsule to a desired receptacle.

Other aspects and features of the teachings disclosed herein will become apparent, to those ordinarily skilled in the art, upon review of the following description of the specific examples of the specification.

DRAWINGS

The drawings included herewith are for illustrating various examples of articles, methods, and apparatuses of the FIG. 1 is a perspective view of a machine in accordance with the present invention;

FIG. 3 (b) is a perspective view of the loading system for the machine shown in FIG. 1 in a closed position with the arm fully retracted;

FIG. 3 (c) is a perspective view of the loading system for the machine shown in FIG. 1 in a closed position with the cover removed;

Figure 1:
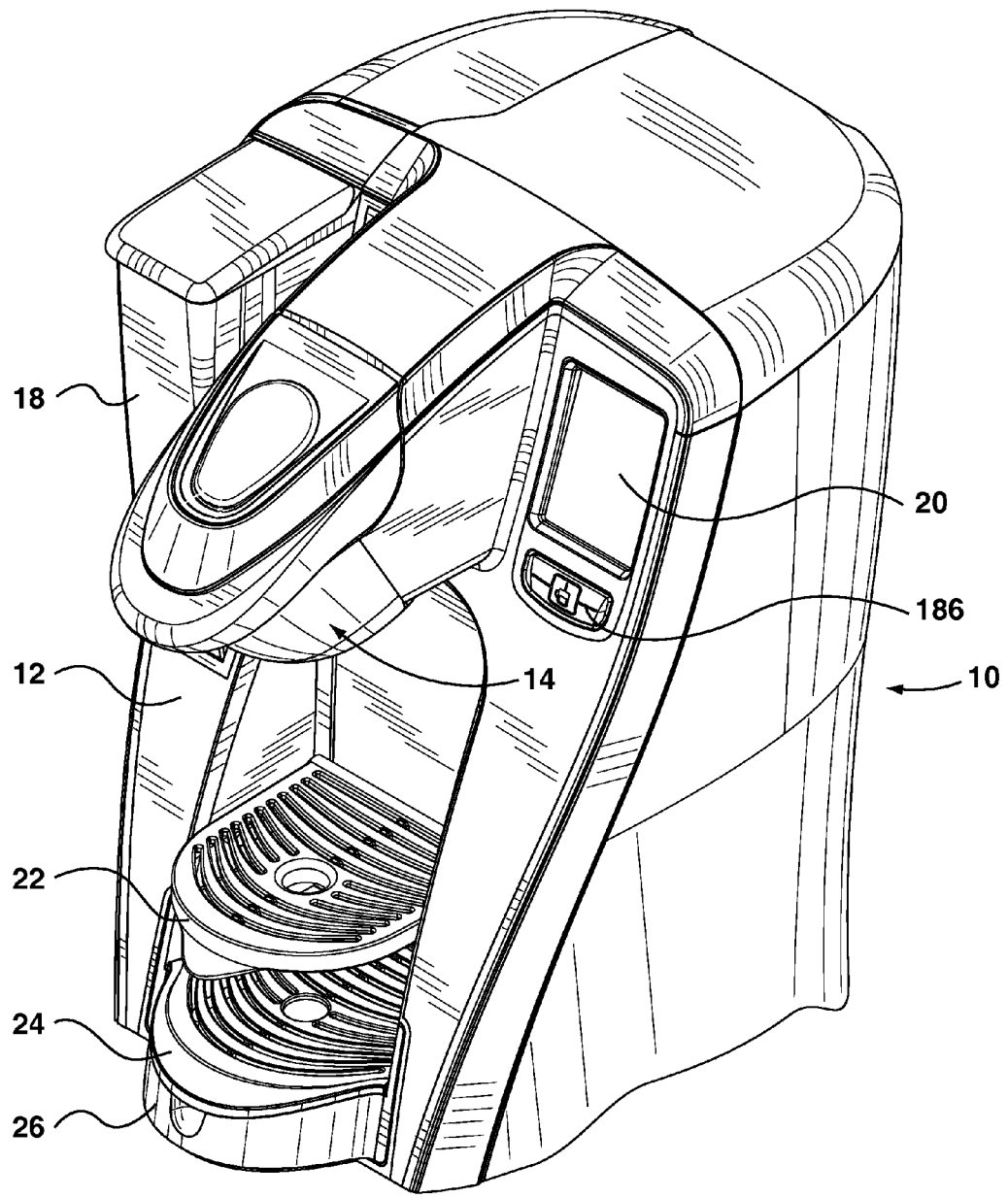
Figure 6:
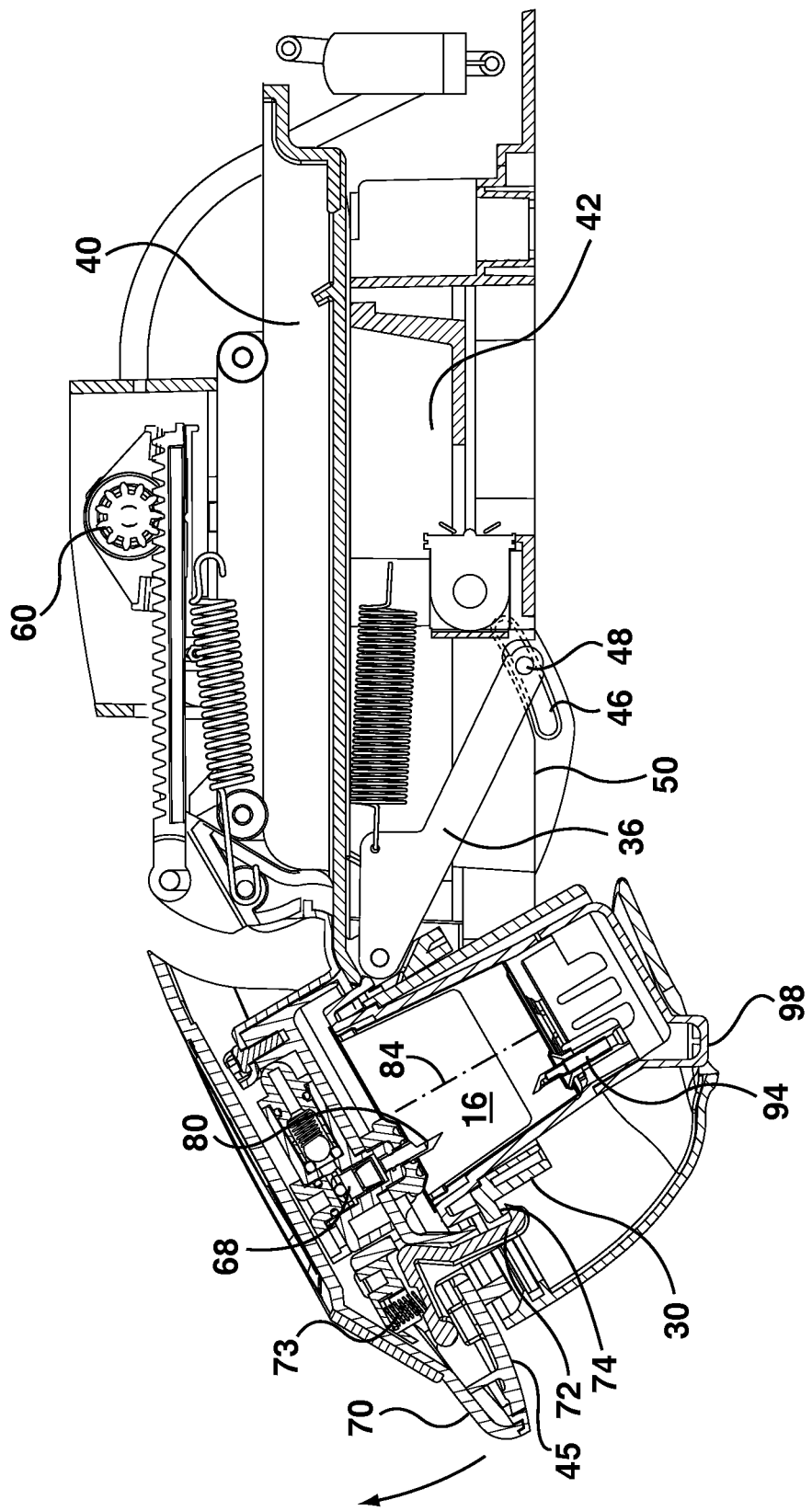
Figure 7:
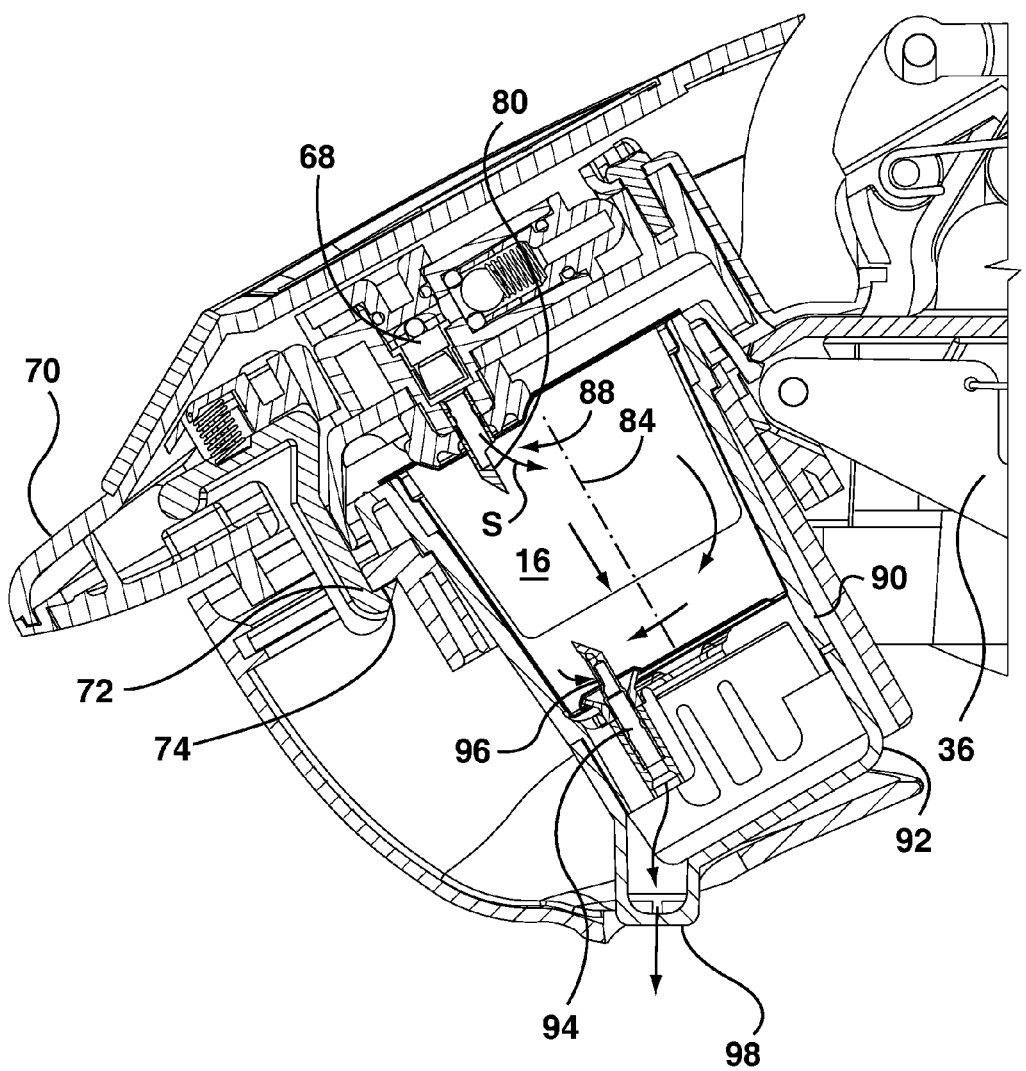
Figure 8:
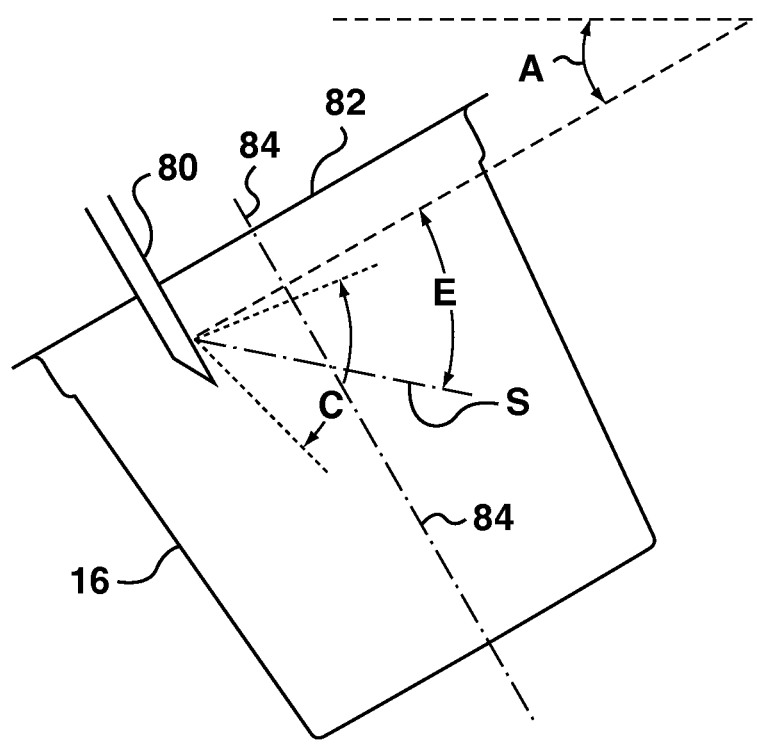
Figure 9:
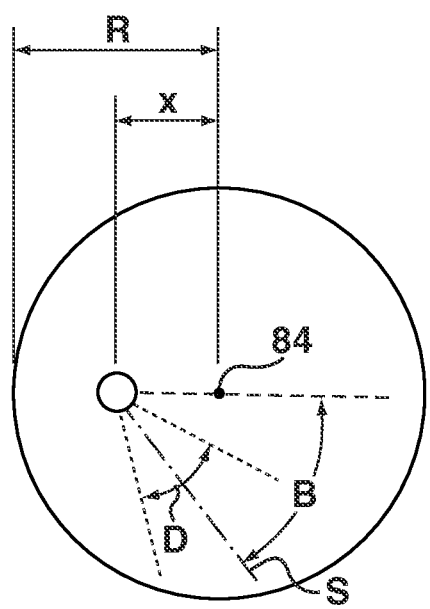
Figure 10:
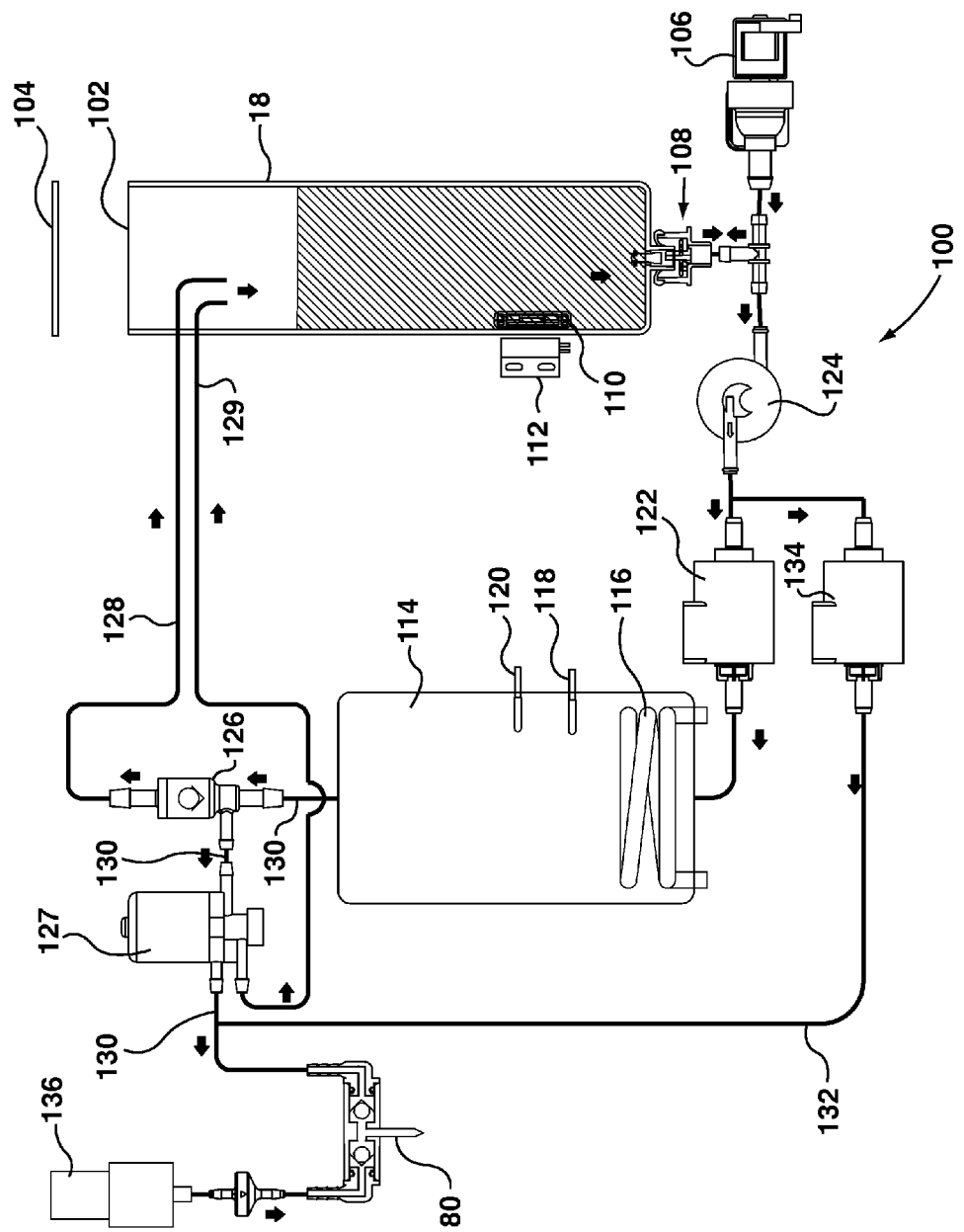
Figure 11:
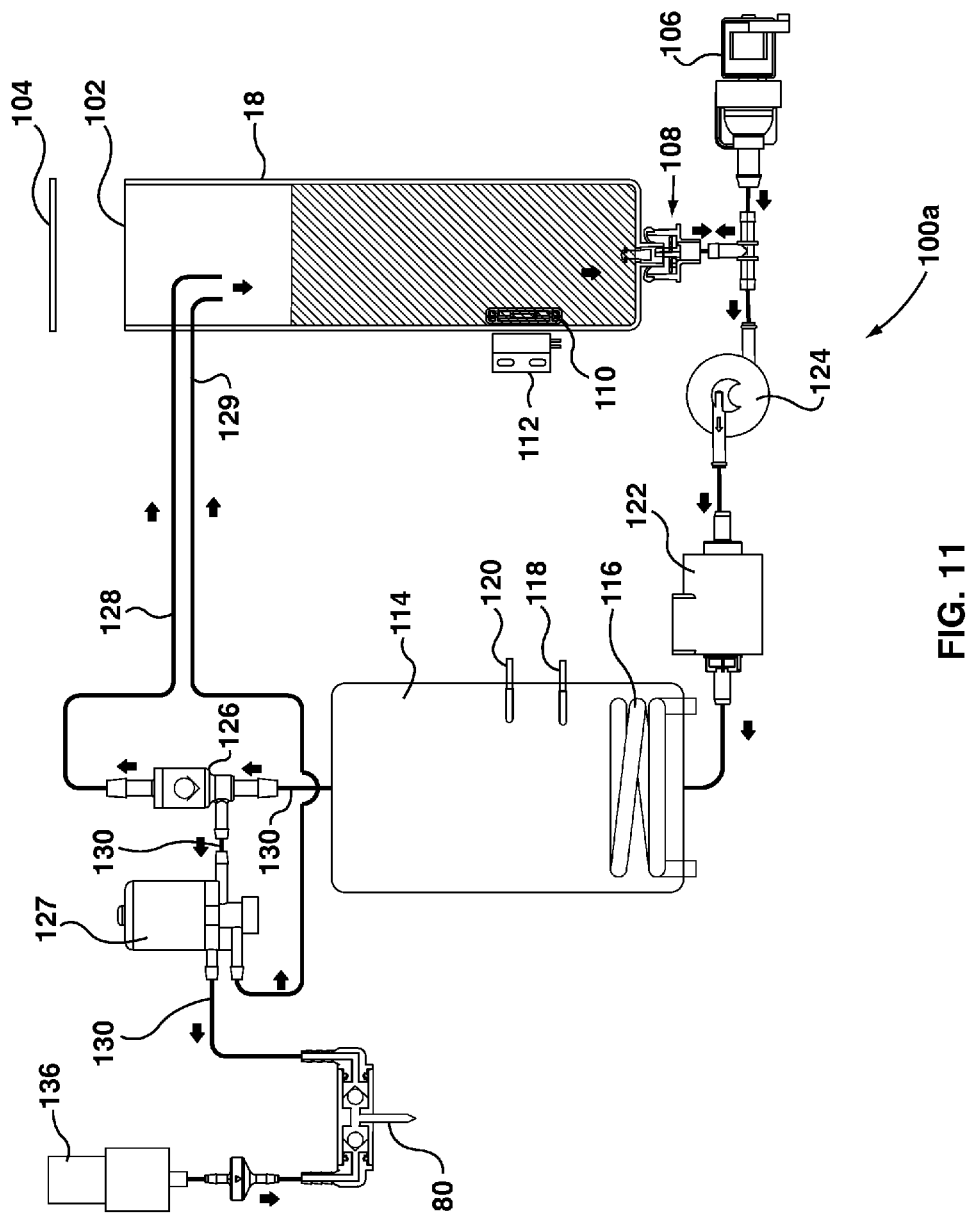
Figure 12:
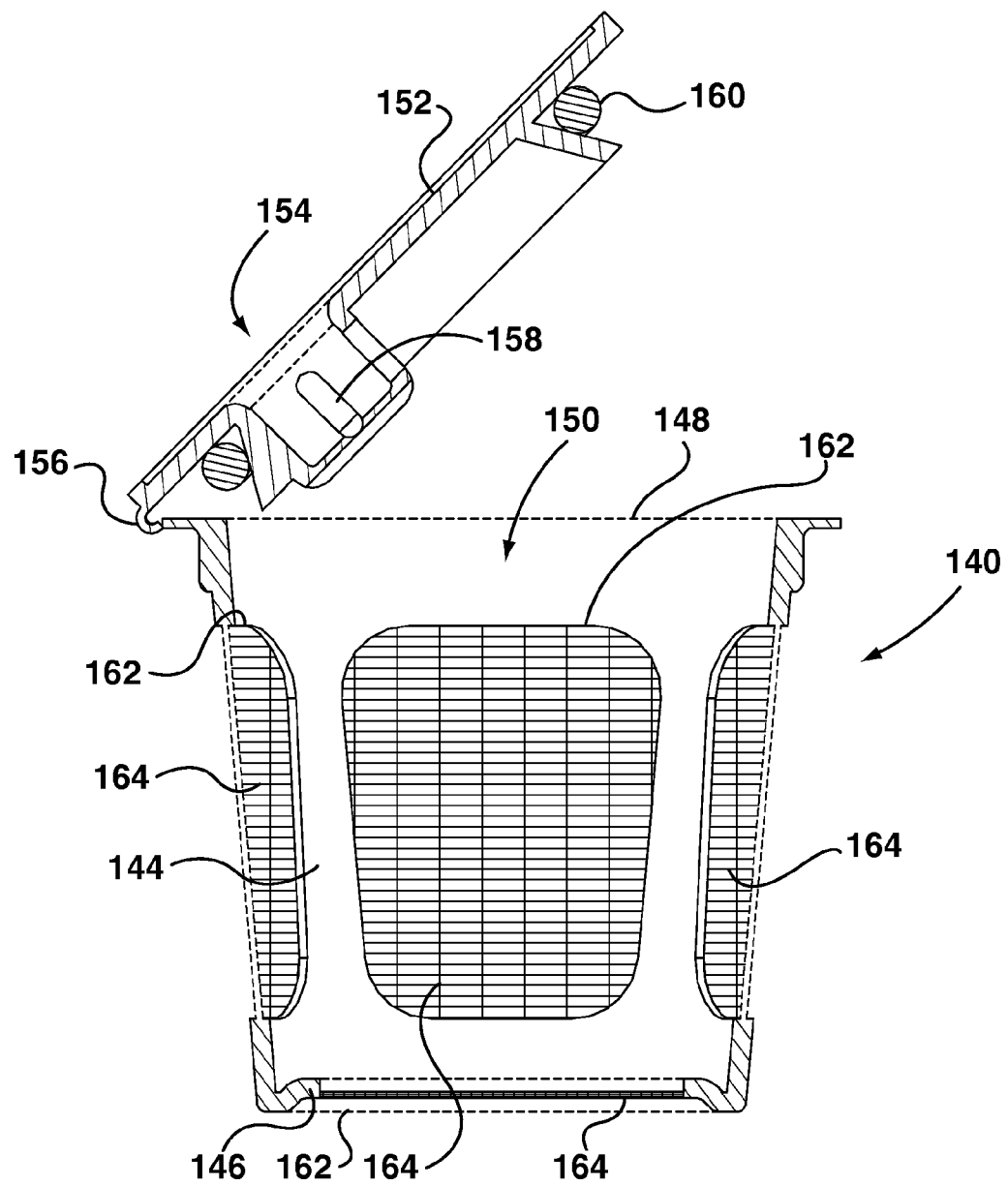

FIGS. 5 (a) to 5 (f) are sectional views of the loading system for the machine shown in FIG. 1 as it moves from an open position to a closed position;

FIG. 6 is a sectional view of the loading system for the machine shown in FIG. 1 as it is unlatched in order to move from a closed position to an open position;

FIG. 7 is an enlarged sectional view of the brew chamber for the machine shown in FIG. 1;

FIG. 8 is an enlarged sectional view of a capsule showing the location where the nozzle for the machine of FIG. 1 pierces the capsule;

FIG. 9 is a top view of the capsule shown in FIG. 8 showing the location where the nozzle pierces the capsule and the direction in which fluid exits the nozzle;

FIG. 10 is a schematic view of a fluid transfer system for the machine shown in FIG. 1;

FIG. 11 is a schematic view of an alternate embodiment of a fluid transfer system for the machine shown in FIG. 1;

FIG. 12 is a side sectional view of a reusable capsule in accordance with the present invention for use with the machine shown in FIG. 1.

Figure 13:
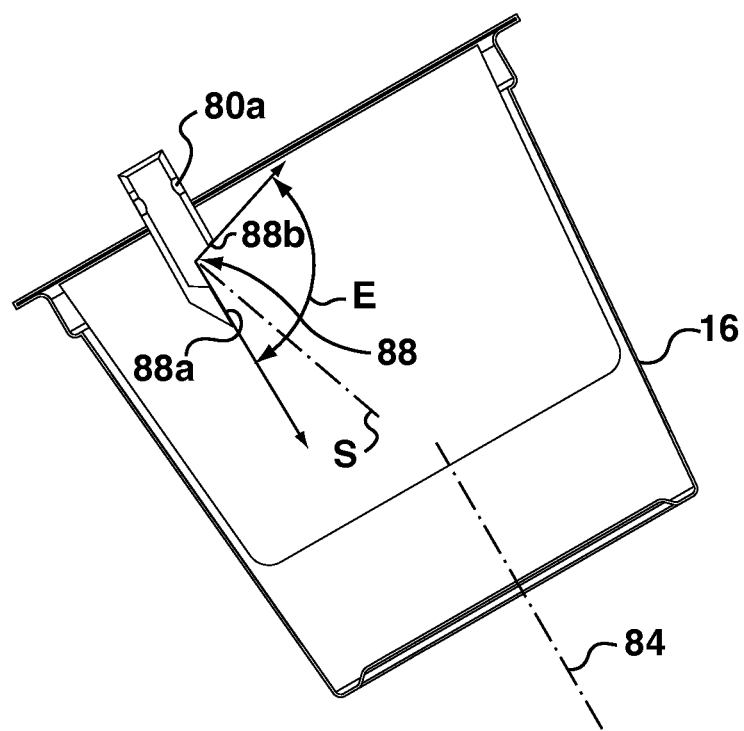
Figure 14:
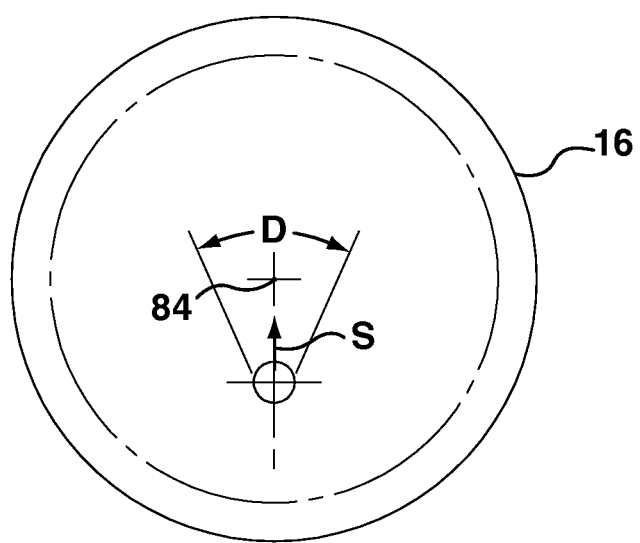
Figure 15:
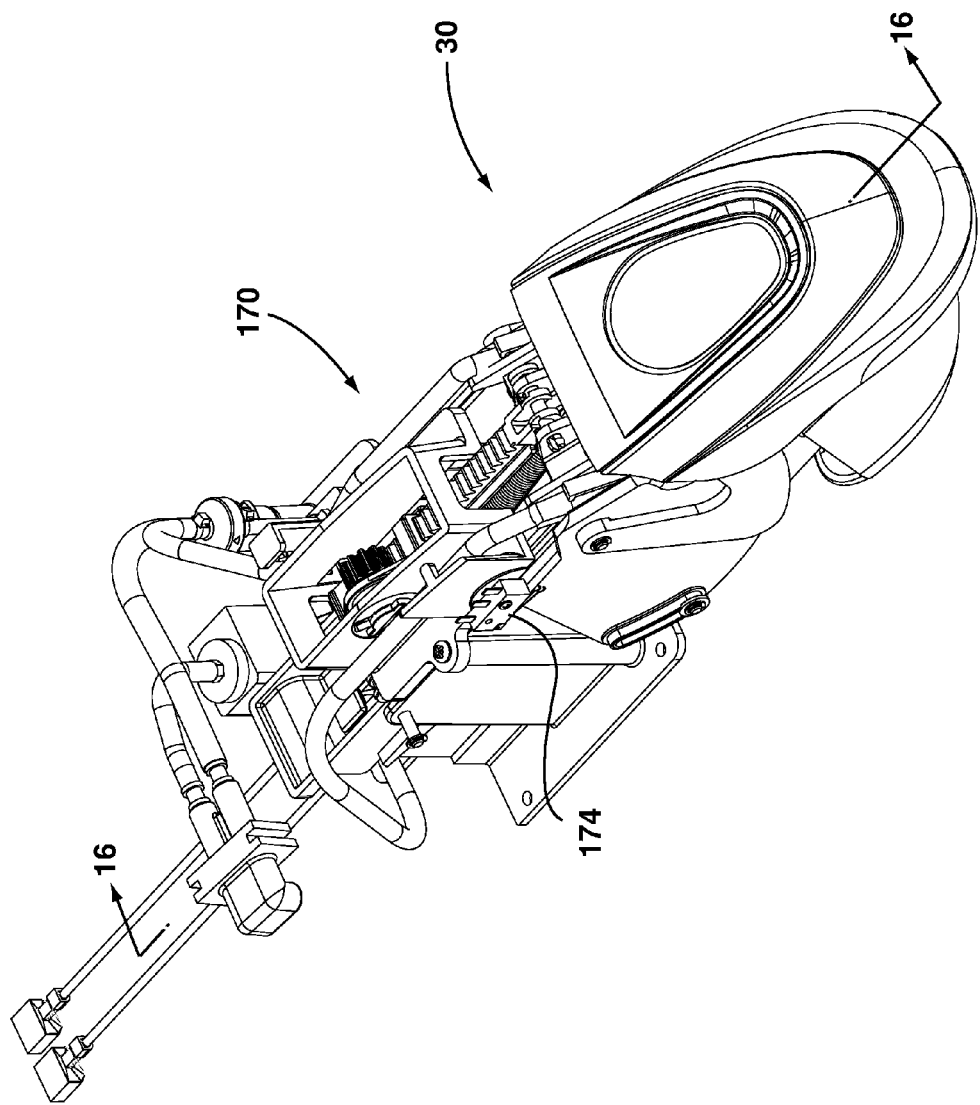
Figure 16:
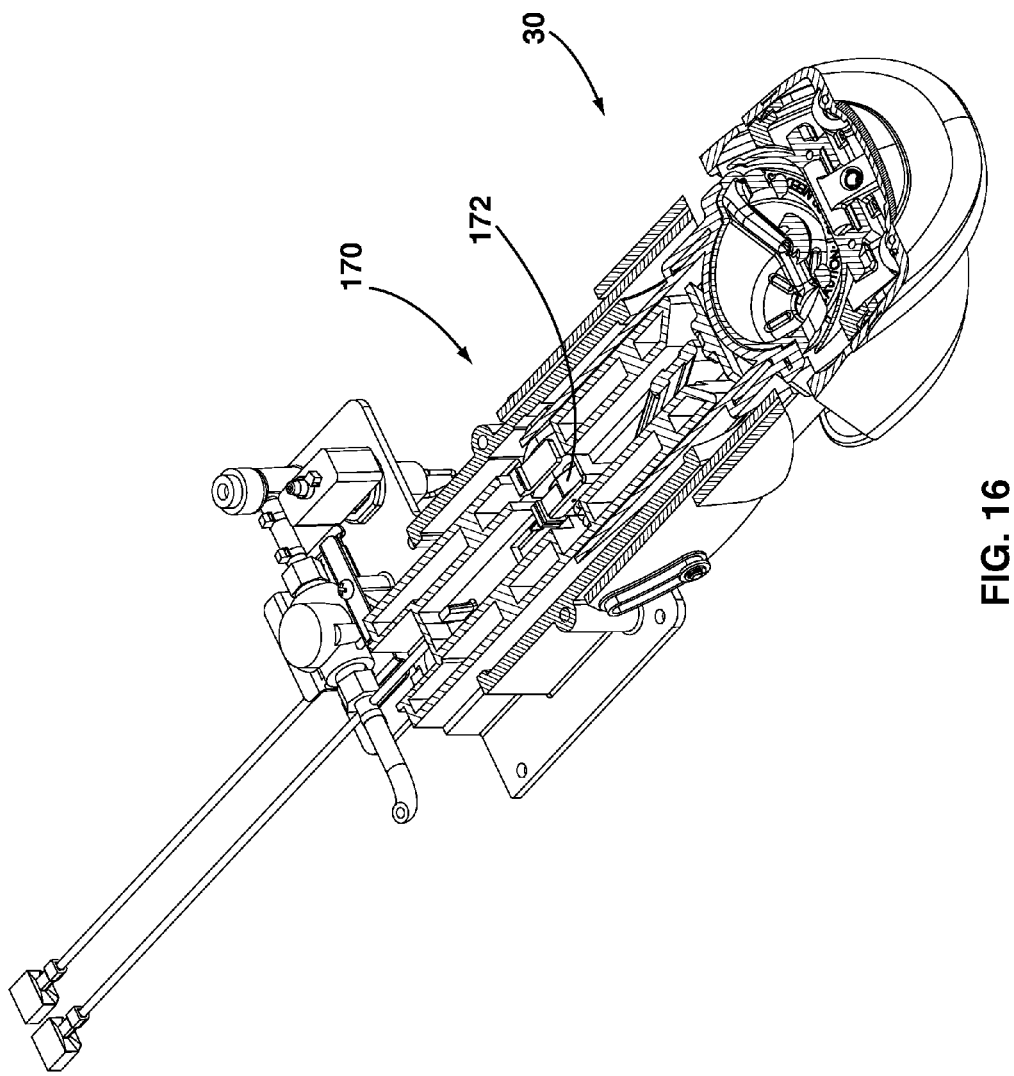
Figure 17:
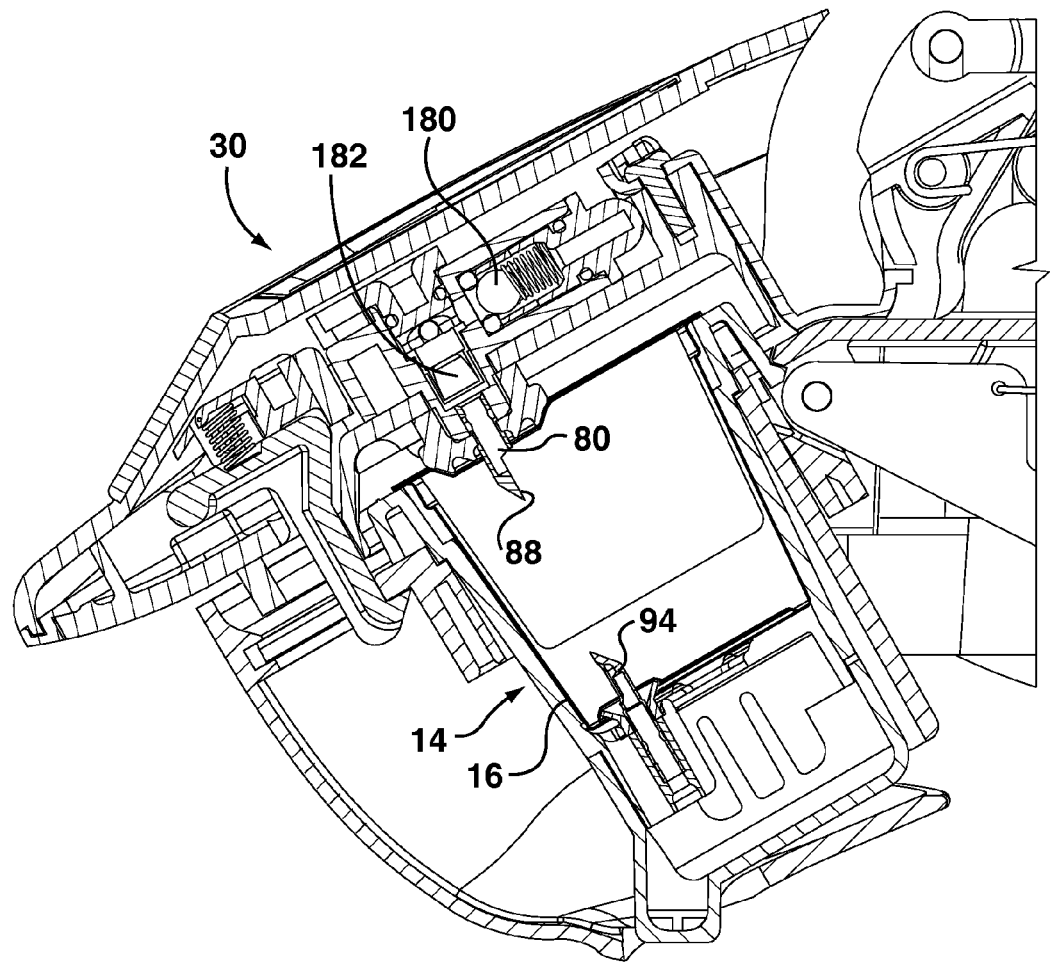
Figure 18:
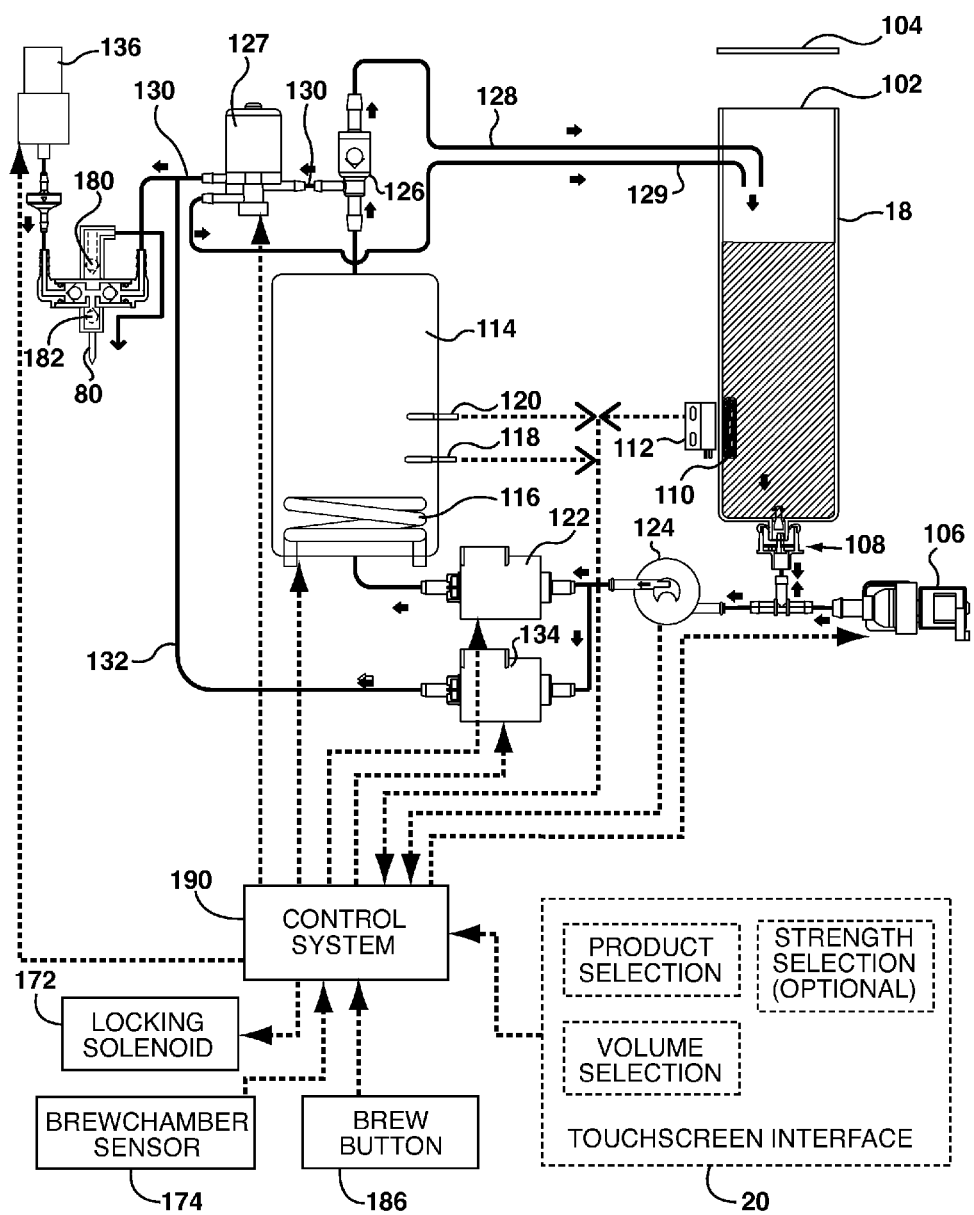
Figure 19:
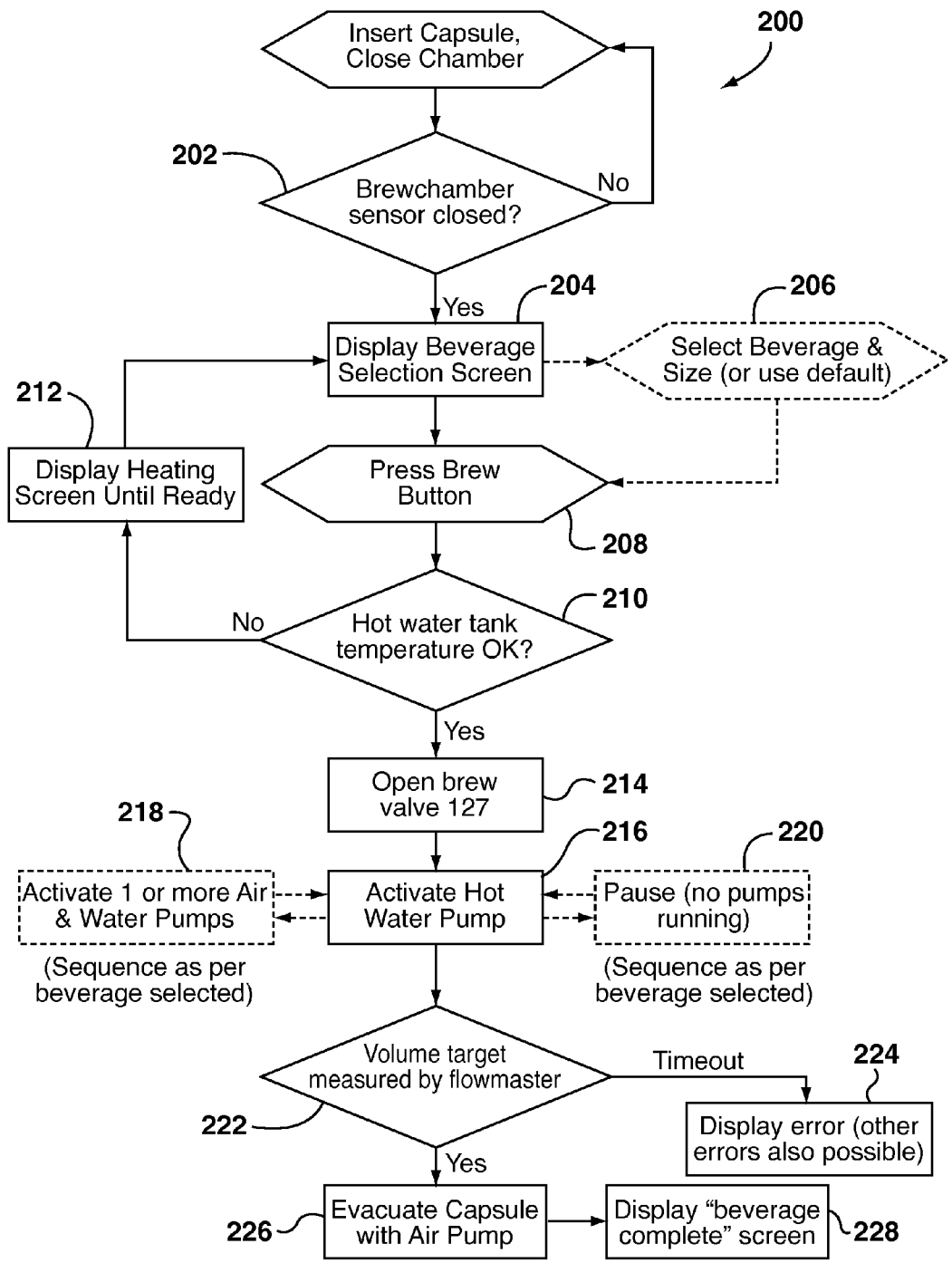

FIG. 13 is an enlarged sectional view of a capsule showing the location where an alternative embodiment of nozzle for the machine of FIG. 1 pierces the capsule;

FIG. 14 is a top view of the capsule shown in FIG. 13 showing the location where the nozzle pierces the capsule and the direction in which fluid exits the nozzle;

FIG. 15 is a perspective view of an alternative embodiment of a loading system for the machine shown in FIG. 1 in a closed position with the arm fully retracted;

FIG. 16 is a sectional view of the loading system shown in FIG. 15 as viewed along lines 16-16;

FIG. 17 is a sectional view of the brew chamber portion of the loading system shown in FIG. 15 as viewed along lines 17-17;

FIG. 18 is a schematic view of an alternate embodiment of a fluid transfer system for the machine shown in FIG. 1 including a schematic for the control system for controlling the operation of the machine; and FIG. 19 is a flow diagram showing a process for preparing a beverage from a capsule using the machine in accordance with an embodiment of the present invention.

DESCRIPTION OF VARIOUS EMBODIMENTS

Various apparatuses or methods will be described below to provide examples of the claimed invention. The claimed invention is not limited to apparatuses or methods having all of the features of any one apparatus or method described below or to features common to multiple or all of the apparatuses described below. The claimed invention may reside in a combination or sub-combination of the apparatus elements or method steps described below. It is possible that an apparatus or method described below is not an example of the claimed invention. The applicant(s), inventor(s) and/or owner(s) reserve all rights in any invention disclosed in an apparatus or method described below that is not claimed in this document and do not abandon, disclaim or dedicate to the public any such invention by its disclosure in this document.

Figure 2:
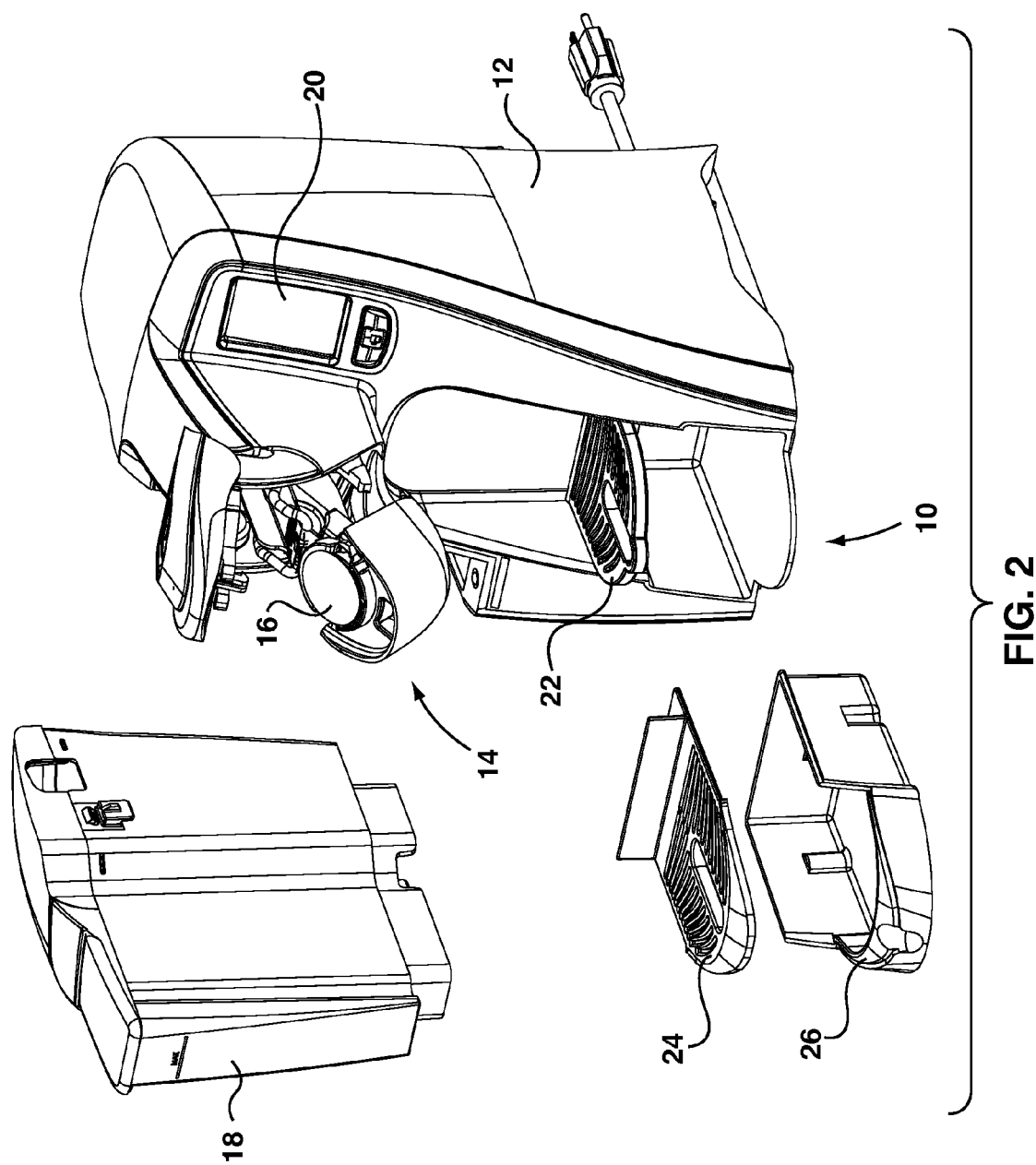
FIG. 2 is an exploded perspective view of the machine shown in FIG. 1.
Figure 3A:
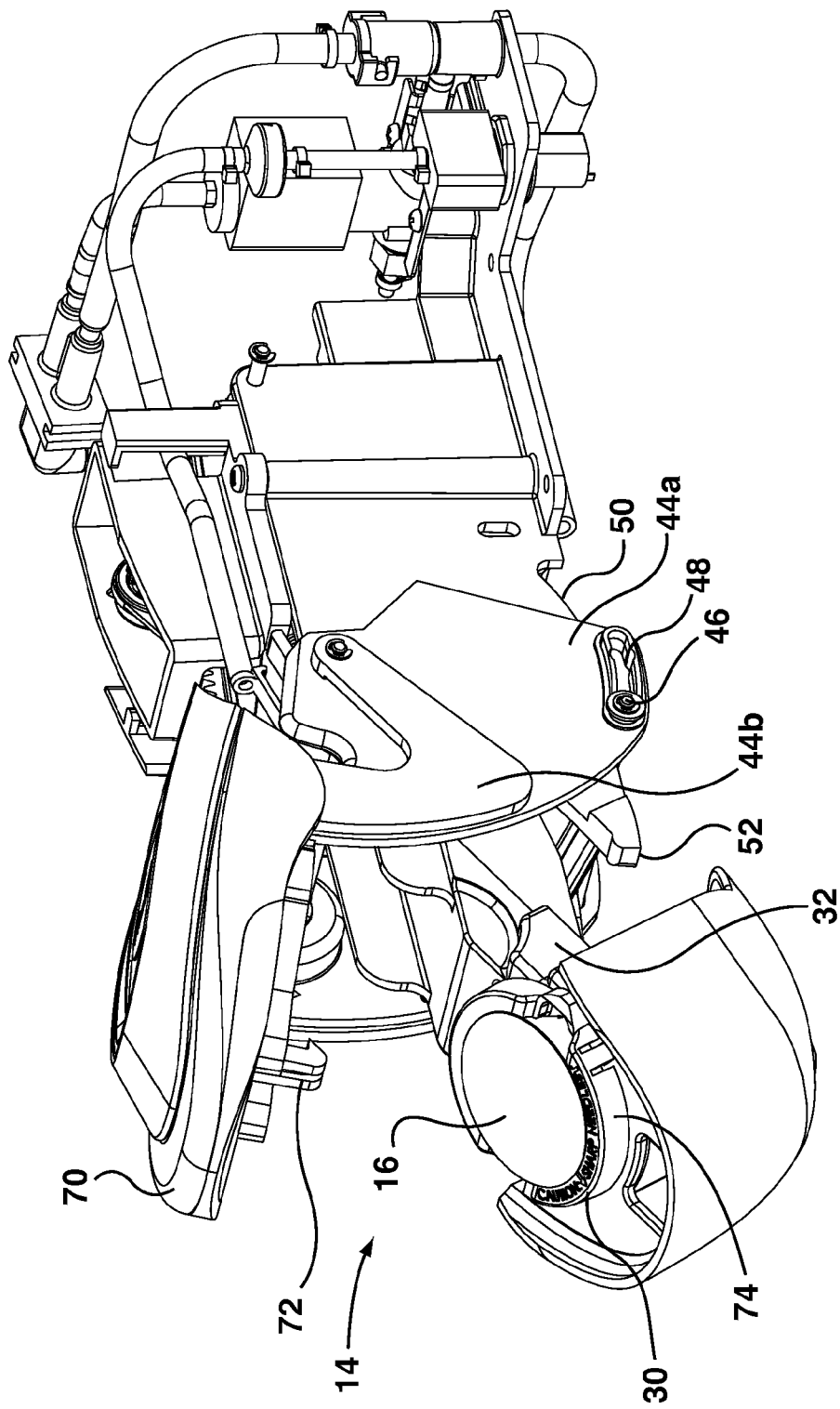
FIG. 3 (a) is a perspective view of the loading system for the machine shown in FIG. 1 in an open position with the arm fully extended.
Figure 3B:
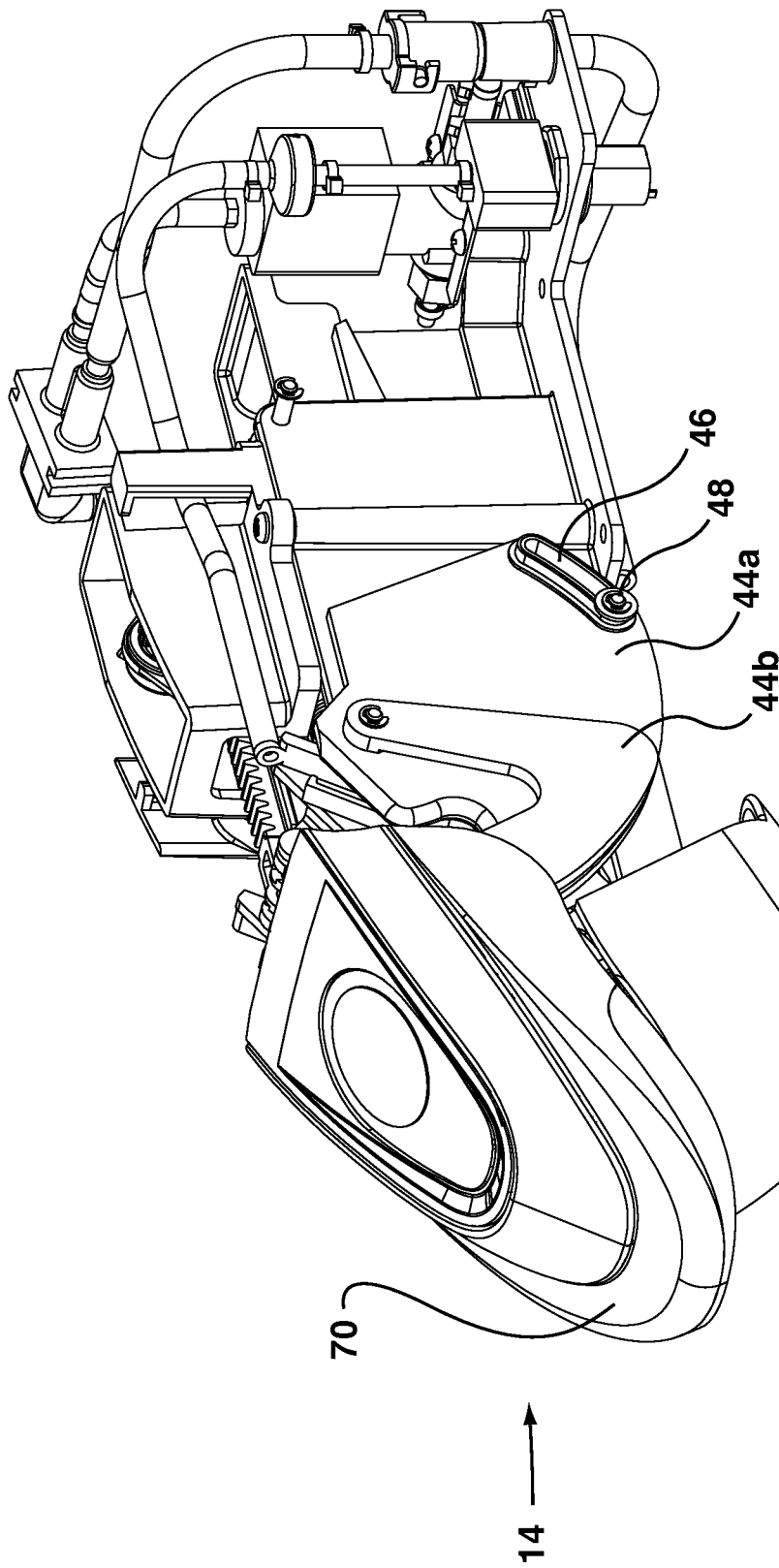
Figure 3C:
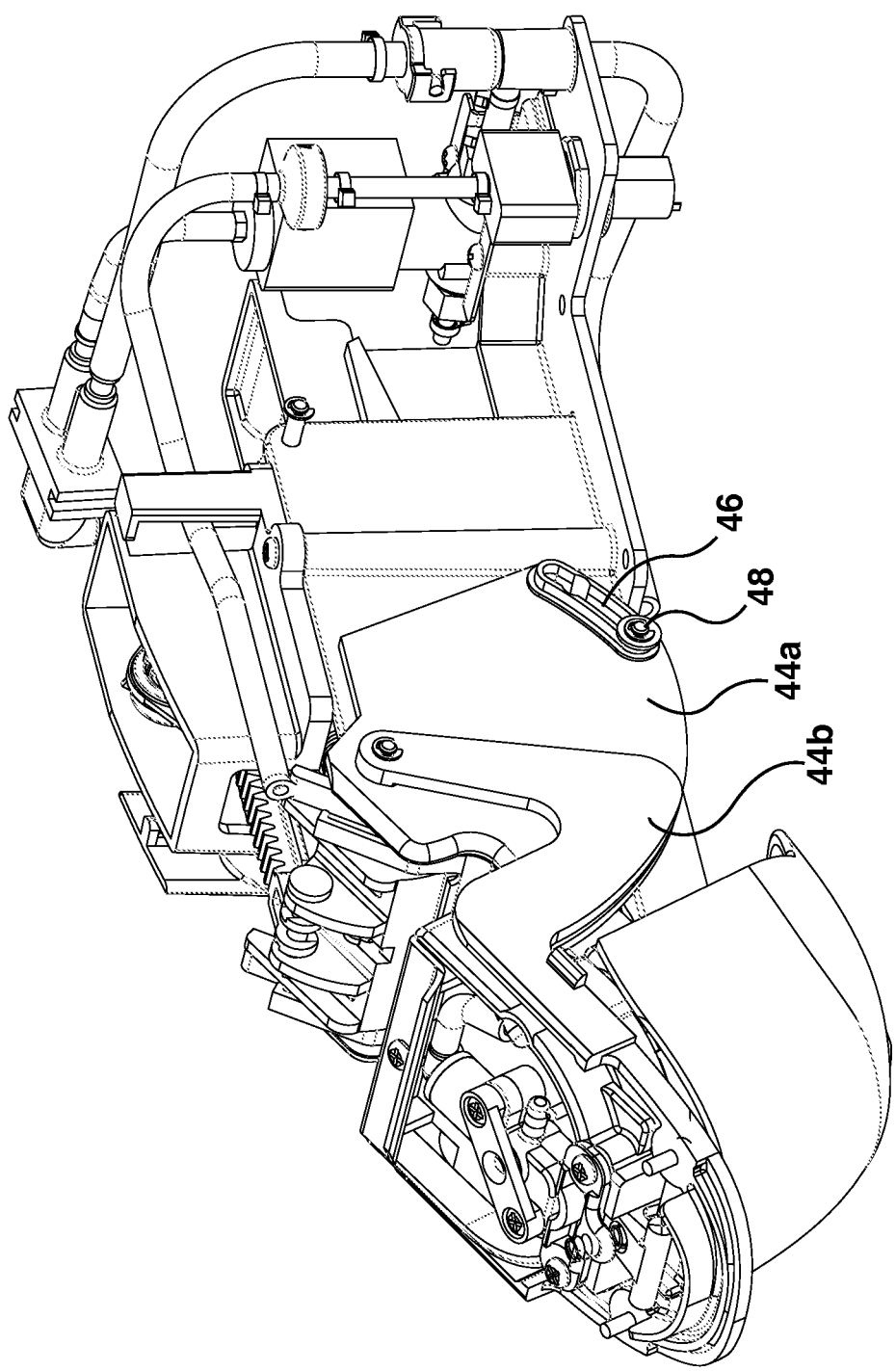
Figure 4:
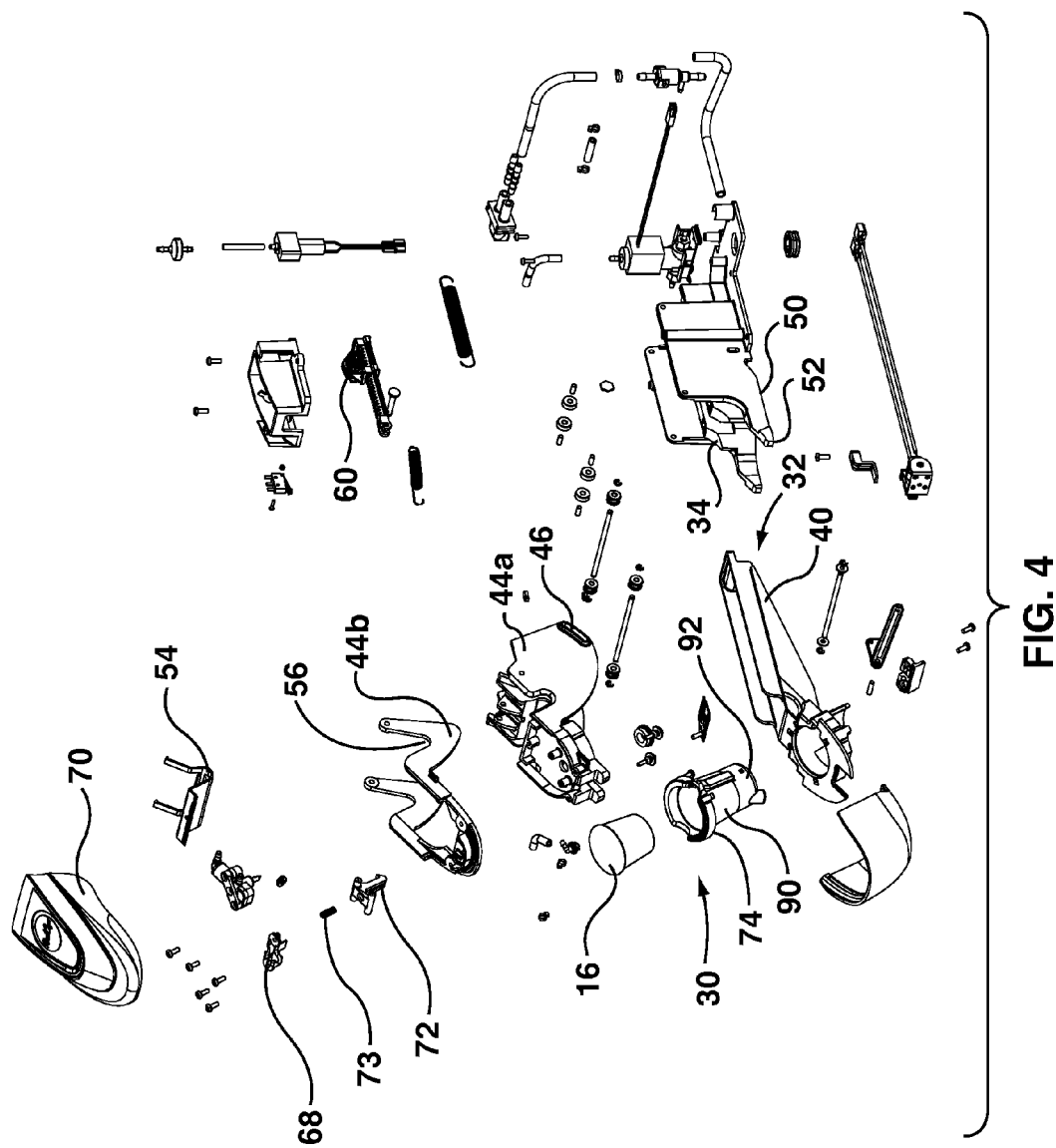
FIG. 4 is an exploded view of the components for the loading system for the machine shown in FIG. 1.

A machine in accordance with the present invention is shown generally at 10 in FIGS. 1 and 2. Machine 10 includes a housing 12 with a brew chamber 14 adapted for receiving a capsule 16. Capsule 16 may be adapted to prepare beverages such as espresso coffee, drip coffee, tea, hot chocolate or soup broth. Capsule 16 may also be adapted to prepare other consumable food or beverage products, such as soups, noodles, hot cereals, baby formulas and medicinal products or any other product that may be formed by injecting a fluid into a capsule containing one or more ingredients.

Machine 10 further includes a fluid reservoir 18, a control interface 20, a flip-down tray 22 pivotally mounted to housing 12 and a grate 24 disposed over a spill reservoir 26. Tray 22 and grate 24 are each adapted to support a receptacle such as a user's cup (not shown) at a desired height. Spill reservoir 26 is adapted to contain an overflow or spill of fluid or prepared product.

Figure 5A:
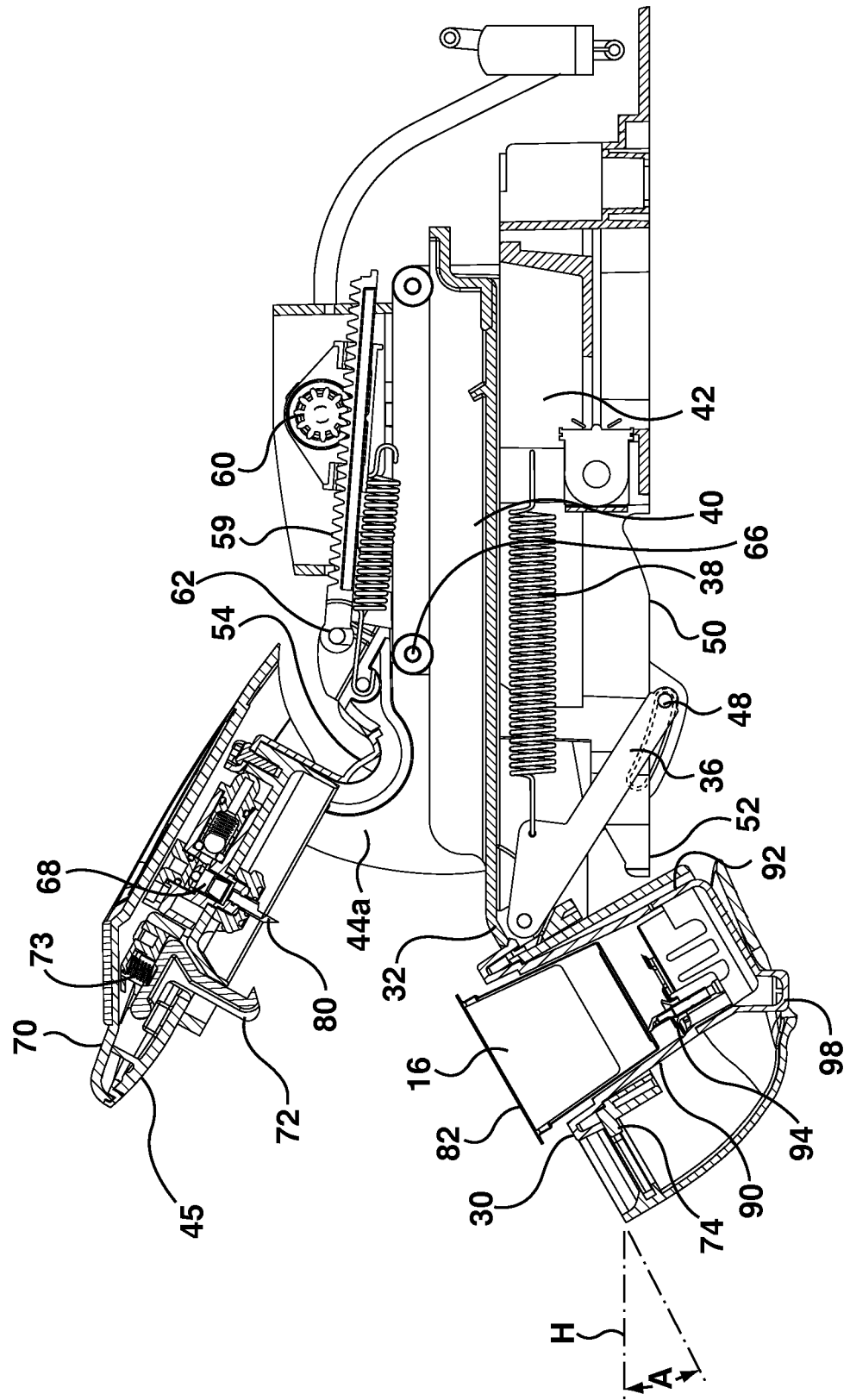

Brew chamber 14 is preferably oriented at a downward angle A relative to a horizontal plane H (see FIG. 5(a)) so that brew chamber 14 is tilted toward a user for easy access, to enhance the quality of the prepared product and to facilitate the evacuation of the product from the capsule following brewing. Thus, when capsule 16 is loaded into brew chamber 14, the top of capsule is also preferably oriented at angle A relative to horizontal plane H. Angle A is between 5 and 85 degrees, preferably between 15 and 60 degrees and more preferably between 25 and 35 degrees.

Referring to FIGS. 3 to 7, a loading system 30 is provided for accessing brew chamber 14. Loading system 30 includes an arm 32 that is connected to a rail assembly 34 by link 36 and return spring 38. Arm 32 includes runners 40 that are adapted to move along rollers 42 on rail assembly 34 with the assistance of a lever assembly 44. Lever assembly 44 includes a first lever 44a and a second lever 44b.

First lever 44a includes a curved slot 46 that is adapted to receive a pin 48 extending from link 36. Pin 48 is adapted to travel along rail 50 of rail assembly 34. The movement of link 36 is limited by the position of curved slot 46. Movement of first lever 44a translates into movement of arm 32 by allowing link 36 to be retracted by return spring 38. Rail 50 includes seat 52 that is adapted to restrict movement of arm 32 once it has reached the fully-retracted position. A guide 54 is disposed in a corresponding recess 56 defined in first lever 44a for preventing fluid and air transfer lines from becoming pinched.

First lever 44a is connected to one end of rack 59 with a pin 62. Rack 59 engages a motion damper 60 to dampen movement of first lever 44a. Motion damper 60 is connected to rail assembly 34.

Second lever 44b is pivotally connected to first lever 44a at pin 66. Second lever 44b supports an injection system 68 for injecting a fluid into capsule 16. A cover 70 is disposed over and secured to second lever 44b to cover injection system 68.

The operation of the loading system as it moves from an open position, with arm 32 fully extended, to a closed position, with arm 32 fully retracted, is shown in FIGS. 5(a) to 5(f) and described in more detail below.

Referring to FIG. 5(a), loading system is disposed in a fully open position with cover 70 raised and brew chamber 14 exposed and extended away from housing 12 to provide easy user access for loading or unloading capsule 16.

Figure 5B:
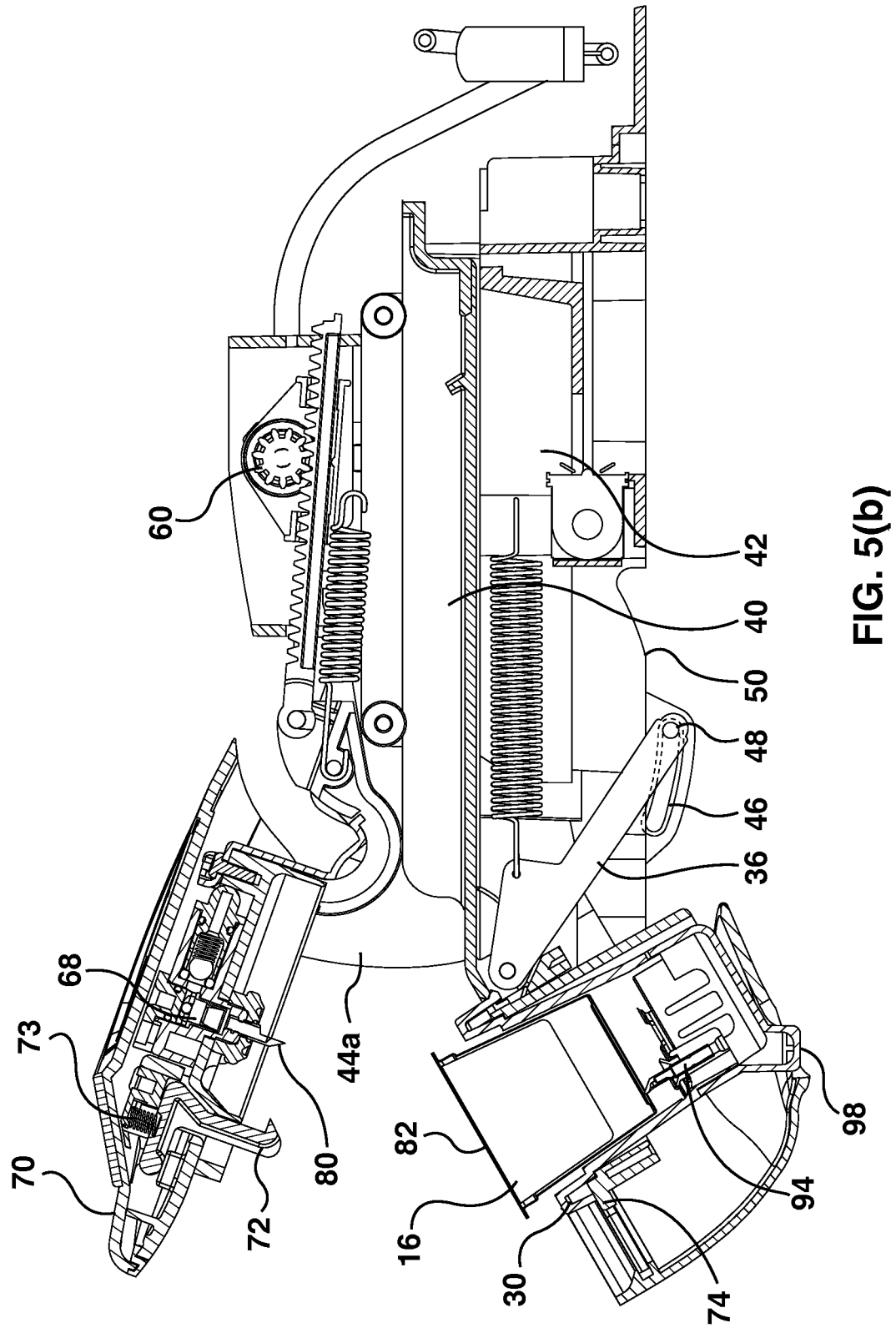

Referring to FIG. 5(b), downward movement of cover 70 causes first and second levers 44a and 44b to pivot in unison. Return spring 38 biases upper portion 36a of link 36 toward housing 12. Pivoting of first lever 44a causes slot 46 to move towards housing 12, which allows link 36 to move towards housing 12, thereby retracting arm 32.

Figure 5C:
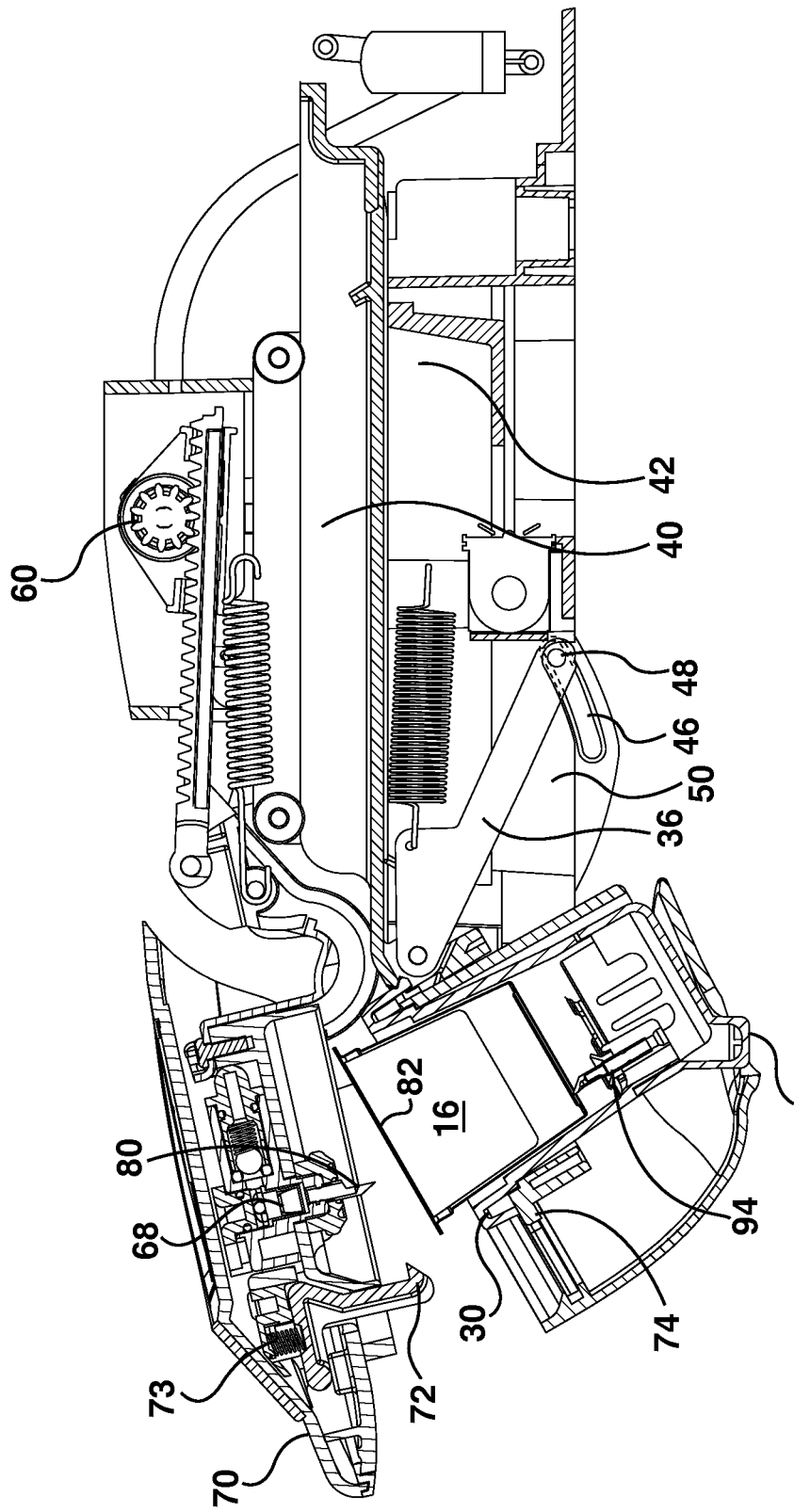

Referring to FIG. 5(c), further downward movement of cover 70 causes further pivotal movement of first and second levers 44a and 44b in unison. Arm 32 continues to move towards housing 12 until it contacts seat 52, at which point arm 32 is fully retracted.

Figure 5D:
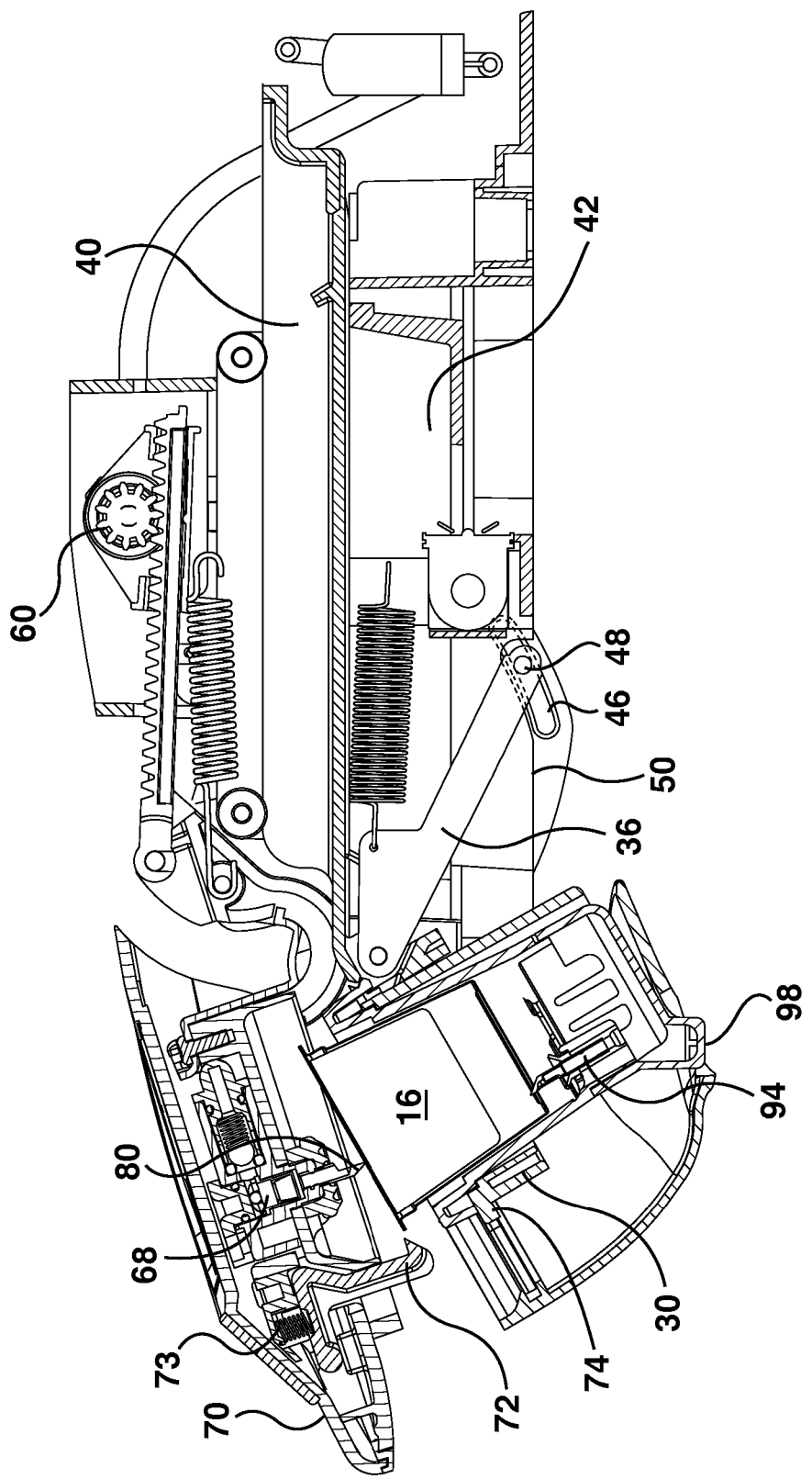

Referring to FIG. 5(d), further downward movement of cover 70 causes first and second levers 44a and 44b to pivot in unison in order to position nozzle 80 for piercing capsule cover 82. Link 36 and pin 48 remain stationary and curved slot 36 in first lever 44a begins to move relative to pin 48. It is noteworthy that arm 32 is maintained in its fully retracted position during the entire capsule piercing process to avoid any sideward tearing of capsule cover 82.

Figure 5E:
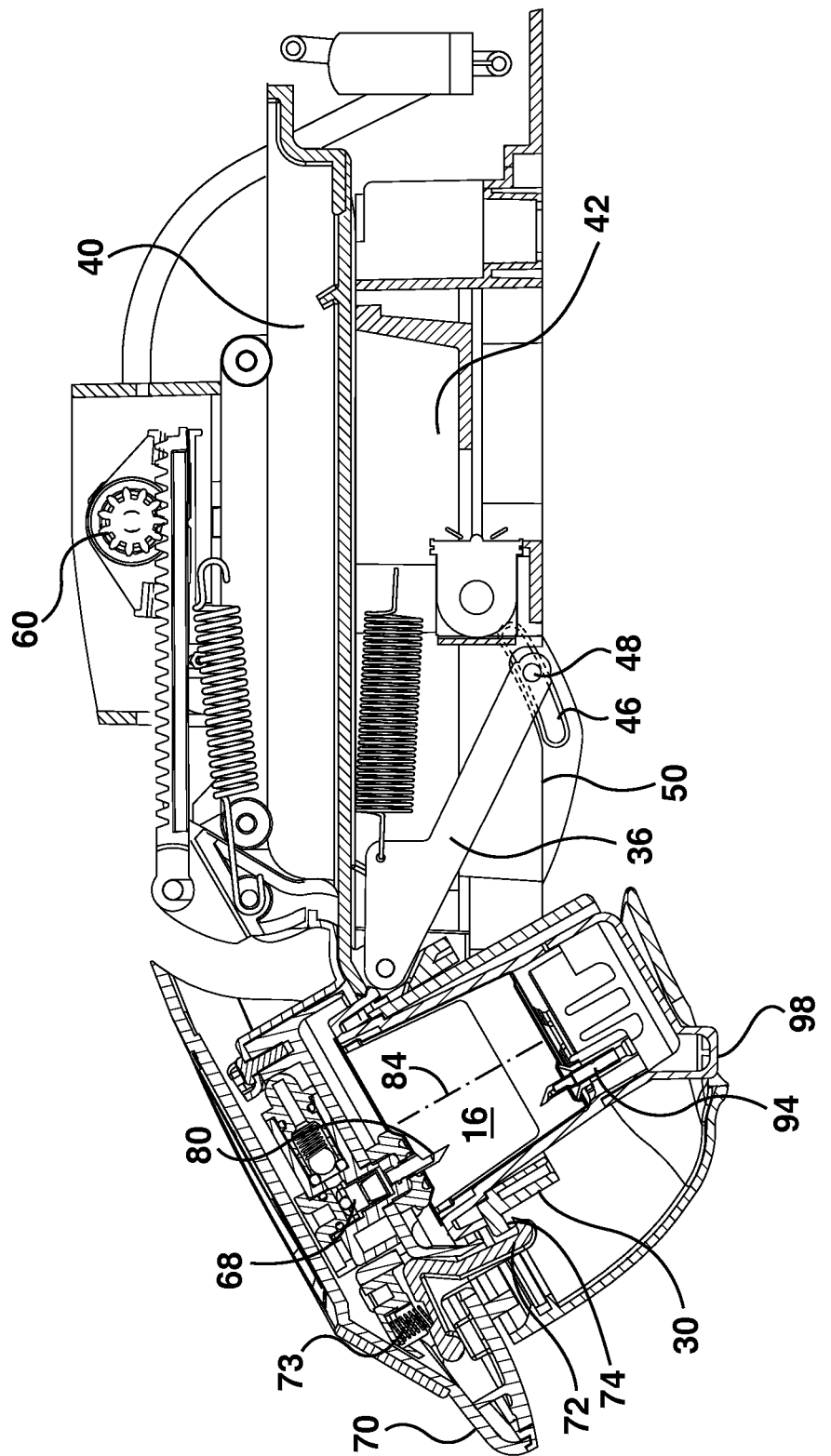

Referring to FIG. 5(e), further downward movement of cover 70 causes first and second levers 44a and 44b to pivot in unison in order that nozzle 80 pierces capsule cover 82 while nozzle seal 80a pushes against capsule cover 82 to force capsule 16 downwards in brew chamber 14 until piercing probe 94 pierces the bottom of capsule 16. Latch 72 contacts flange 74, forcing latch 72 to rotate, compressing latch spring 73.

Figure 5F:
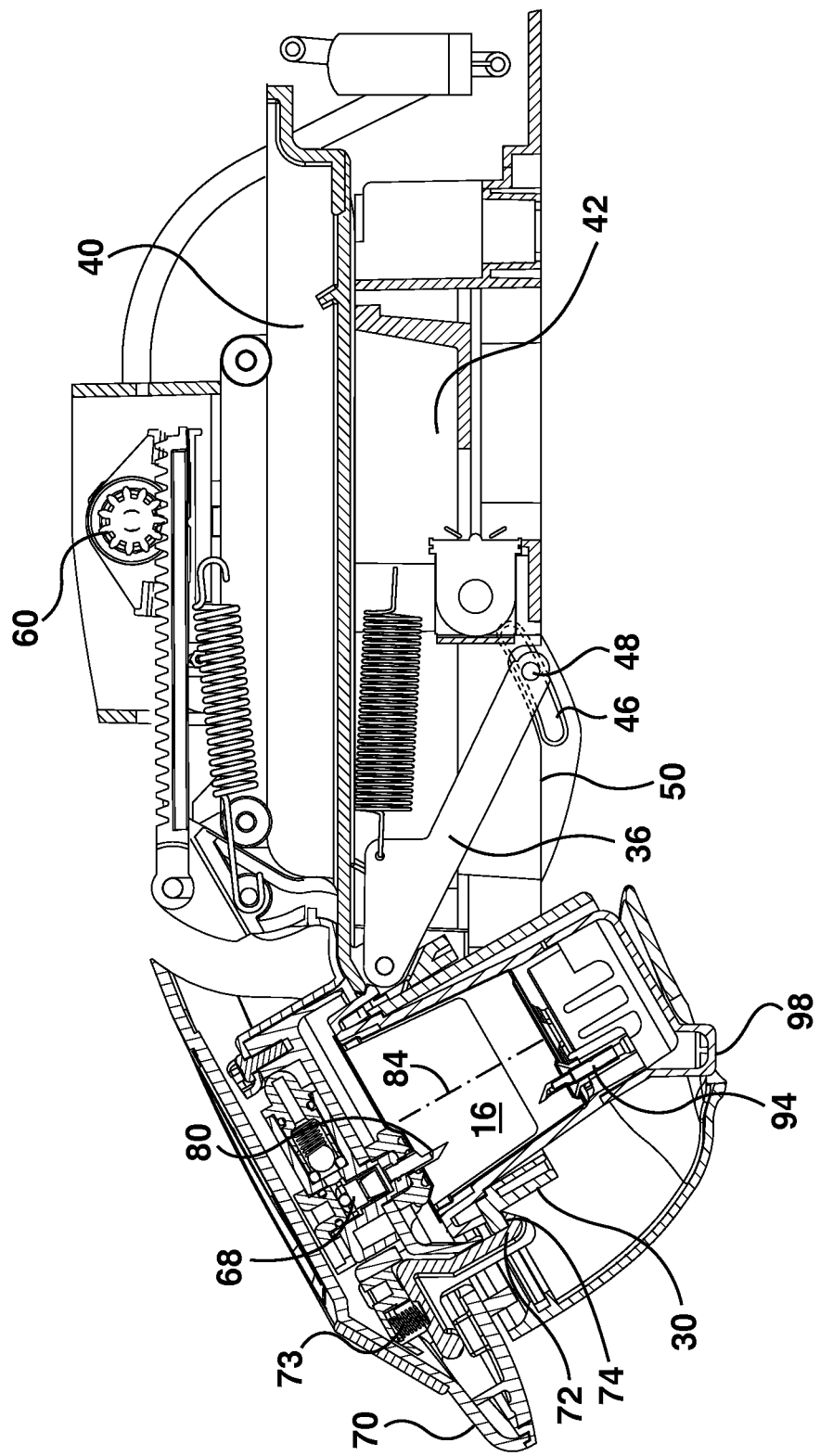

Referring to FIG. 5(f), further downward movement of cover 70 causes first and second levers 44a and 44b to pivot in unison in order that latch 72 snaps into engagement with flange 74. Once latch 72 engages flange 74, loading system 30 is in condition for injecting fluid into capsule 16 for preparing a desired beverage.

Referring to FIG. 6, upward movement of a release tab 45 on second lever 44b causes second lever 44b to pivot relative to first lever 44a, compressing latch spring 73 and causing latch 72 to disengage from flange 74. Further upward movement of cover 70 causes corresponding movement of loading system 30 in the reverse order as described above to remove nozzle 80 from capsule 16 and extend arm 32 away from housing 12 to expose capsule 16 for removal by user.

Referring to FIGS. 7-9, injection system 68 includes a nozzle 80 that is adapted for piercing a cover 82 of a capsule 16 at a location that is offset from the central axis 84 of capsule 16. Preferably, nozzle 80 is adapted to pierce cover 82 at a location that is lower than central axis 84 and most preferably at a location that is proximate to the lowest end of capsule 16.

Nozzle 80 preferably includes an opening 88 disposed on one side of nozzle 80 for injecting fluid along a path that swirls around central axis 84. Opening 88 preferably emits a spray of fluid in the direction of arrow S at an angle B away from the plane bisecting nozzle 80 and central axis 84. Angle B is between 10-60 degrees, preferably 20-40 degrees and most preferably 25-35 degrees. As shown in FIG. 8, opening 88 preferably is configured to direct a spray of fluid that is directed at an angle E at least partially toward the bottom of capsule 16. Angle E is between 10-60 degrees, preferably 20-40 degrees and most preferably 25-35 degrees. The spray of fluid exiting opening 88 has a vertical angle of spread C that is between 10-90 degrees, preferably 25-65 degrees and more preferably 35-55 degrees. As shown in FIG. 9, the spray of fluid has a horizontal angle of spread D that is between 5-90 degrees, preferably 5-50 degrees, most preferably 10-20 degrees.

Referring to FIG. 7, brew chamber 14 includes an upper portion 90 and a lower portion 92. Lower portion 92 may be separated from upper portion 90 for cleaning or repairing components of the brew chamber 14. Lower portion 92 includes a dispensing system 94 such as a probe that pierces a lower portion of capsule 16. Preferably piercing probe 94 is offset from central axis 84 so that the lowest portion of capsule is pierced. Product that has been prepared within capsule 16 then flows through an opening 96 in piercing probe 94, through a dispensing nozzle 98 to user's cup (not shown). Opening 96 in piercing probe 94 is preferably located on the side of probe 94, and more preferably on the side of probe 94 which is oriented towards the lowest part of the capsule to ensure maximum evacuation of the beverage from the capsule at the completion of the brewing cycle. Probe 94 and opening 96 are adapted for dispensing a beverage product from capsule 16. A larger size probe 94 and/or opening 96 or an entirely different dispensing system may be utilized for dispensing beverages or other products from capsule 16 (such as products having larger sized insoluble ingredients or a viscous consistency).

Referring to FIG. 10, a schematic view of a fluid transfer system 100 is shown. Fluid transfer system 100 includes fluid reservoir 18 as shown also in FIGS. 1 and 2. Fluid reservoir 18 may be filled with fluid (typically water) through an opening 102 sealed with cover 104. A fluid level sensor 110, such as a magnetic float, identifies when the fluid level is below a designated level and signals that a refill is required. Sensor 110 will trigger an indicator (not shown) at control interface 20 to indicate to a user that a refill is required. Alternatively, fluid transfer system 100 may be connected to the water mains, in which case fluid reservoir 18 is automatically refilled by opening water inlet valve 106.

Fluid transfer system 100 further includes a fluid heating tank 114 for heating fluid to a desired temperature. Fluid heating tank 114 includes a heating element 116, a temperature sensor 118 and fluid level sensor 120. When the machine is first powered on, fluid level sensor 120 determines whether the fluid heating tank is filled to the minimum level. If not, it prompts the user to run an initialization sequence to fill the fluid heating tank 114. Thereafter, if fluid sensor 120 indicates that the fluid level is below a designated level it will activate a warning condition, preventing the initialization of a brewing cycle until the warning condition has been corrected. Alternatively, fluid may be heated through the use of an in-line instantaneous heater or by a phase-changing heat sink which is in turn heated by an electric heating element, or by these means used in combination with each other and/or in combination with a fluid holding tank and/or fluid heating tank.

Fluid heating tank 114 is preferably filled to the top with fluid. A fluid transfer line 130 leads from heating tank 114 to a pressure relief valve 126. Pressure relief valve 126 is a 3-way valve that connects to a controlled brew valve 127 by another fluid transfer line 130 and to a desired venting location (such as reservoir tank 18) by a vent line 128. Controlled brew valve 127 is another 3-way valve that is connected to nozzle 80 by transfer line 130 and to a vent line 129 that vents to a desired location such as to fluid reservoir 18. Controlled brew valve 127 will open whenever a brew cycle is completed or suspended, in order to prevent pressure buildup due to heating of fluid tank 114. Safety pressure relief valve 126 will open under any conditions that cause the pressure in the fluid heating tank 114 to rise above the set point, including fluid expansion due to heating, leaking or faulty water inlet valve 106, faulty controlled brew valve 127 or fluid flow restriction at the exit of fluid heating tank 114 or at some later point in the flow path during brewing.

When it is time to inject fluid into a capsule 16, piston pump 122 may be activated to pump a designated amount of fluid into fluid heating tank 114 as measured by flow meter 124. A corresponding amount of heated fluid is thereby displaced from fluid heating tank 114 through fluid transfer line 130 to pressure relief valve 126 and, provided that an excess pressure is not present, through another fluid transfer line 130 to controlled brew valve 127 and, if an excess pressure is not present, then through another fluid transfer line 130 to injection nozzle 80 for injection of fluid into capsule 16. Fluid transfer line 130 will preferably remain primed with fluid for the next capsule. This fluid will cool somewhat if it resides in line for an extended period, so transfer line 130 will preferably be designed so that the amount of cooled fluid is negligible compared to the amount of heated fluid provided from the fluid heating tank 114.

Fluid transfer system 100 also provides the option of supplying non-heated fluid to injection nozzle 80 through secondary fluid transfer line 132. A chilled fluid supply (not shown) may also be incorporated instead of or as well as the non-heated fluid supply. Chilled fluid may be chilled using a refrigeration compressor, electric chiller, phase-changing material or other means, or by a combinations of these or other means. Non-heated fluid and/or chilled fluid may be provided on their own or mixed with each other and/or with heated fluid to produce a beverage having a desired temperature. This may be desired to produce a lower temperature beverage (eg warm instead of hot) or a cold beverage as preselected by user through control interface 20. Non-heated fluid from fluid reservoir 18 or from fluid inlet valve 106 is pumped through secondary fluid transfer line 132 using non-heated fluid pump 134 and measured using flow meter 124. In the case where fluid will be mixed to produce an intermediate temperature, this may be accomplished by alternatively running fluid pumps 122 and 134 and using flow meter 124 to measure the respective volume of each fluid temperature. Alternatively, fluid pumps 122 and 134 may be run simultaneously with the volume of each fluid calculated from the overall flow rate as measured by flow meter 124, based on the known pumping flow rates of pumps 122 and 134, respectively. A combination of these methods may also be used. Alternatively, a second flowmeter (not shown in drawings) may be included, so that the flow rates of the hot and cold fluids can be measured independently.

Fluid transfer system 100 further includes an air pump 136 for pumping a small volume of air through injection nozzle 80 following injection of fluid in order to clear the line through injection nozzle 80 and to clear capsule 16. Air pump 136 may also be used simultaneously or in sequence with the pumping of fluid in order to introduce air into the beverage where this is desired, for example to produce additional froth or crema, or to evacuate liquid between different stages of brewing to achieve desired beverage characteristics.

Referring to FIG. 11, a schematic view of an alternate embodiment of fluid transfer system 100a is shown. The same numerals have been used to refer to similar features as shown in FIG. 10.

Fluid transfer system 100a does not include non-heated fluid line 132 and non-heated fluid pump 134. In all other respects, fluid transfer system 100a is the same as system 100 shown in FIG. 10. System 100a provides a simplified arrangement without the option of adding non-heated fluid through nozzle 80.

Referring to FIG. 12, a reusable capsule adapted for use with machine 10 in accordance with the present invention is shown generally at 140. Reusable capsule 140 includes a body 142 that is adapted to fit within brew chamber 14 of machine 10. Body 142 includes a sidewall 144 that extends from an end wall 146 to an opening 148 to define an interior space 150 for receiving ingredients (not shown) for preparing a desired product. Body 142 is preferably sized to define a space between the wall of brew chamber 14 and sidewall 144 of capsule 140.

A cover 152 may be disposed over opening 148 to contain ingredients while product is prepared in brew chamber 14. Cover 152 includes an annular inlet 154 that is offset from the centre axis of capsule 140 to receive injection nozzle 80 for injecting fluid into capsule 140. Cover 152 may be secured to body 142 by a connector 156 such as a hinge or a threaded connection. Inlet may include openings 158 configured to direct fluid in a circular swirling pattern around the centre axis of the capsule. Cover 152 may include a seal 160 to form a hydraulic seal between cover 152 and body 142 of the capsule.

Sidewall 144 includes at least one opening 162 for permitting product to flow from interior space 150 to brew chamber 14. A filter 164, which is preferably a reusable filter but may be a disposable filter, may be disposed over opening 162 to filter ingredients from the prepared product. Preferably, capsule 140 includes a plurality of openings 162 covered with reusable filter 164 constructed using a mesh made of stainless steel, plastic or other materials, a multitude of small perforations in the capsule body, or other means. Endwall 146 of capsule 140 is constructed so as not to interfere with the dispensing system 94 of machine 10.

Referring to FIGS. 13 and 14, an alternate embodiment of nozzle is shown at 80a as it pierces and injects fluid into capsule 16. The same numerals have been used to refer to similar features as shown in corresponding figures above.

Nozzle 80a includes an opening 88 that is adapted to direct fluid into capsule 16 in the direction of arrow S along a downward path that is directed towards the central axis 84. This differs from the embodiment shown in FIGS. 8 and 9 where the fluid is directed along a path that swirls around axis 84.

Opening 88 is defined by a wall having a first portion 88a that extends generally parallel to central axis 84 and a second portion 88b that extends at an angle E relative to first portion 88a. Angle E is preferably between 15 and 160 degrees, more preferably between 60 and 160 degrees, most preferably 120 degrees.

Referring to FIG. 14, it may be seen that fluid is sprayed into capsule 16 along a path S that is directed towards the central axis 84. The spread of the spray (angle D) is preferably between 10 and 135 degrees, more preferably between 30 and 100 degrees, most preferably 70 degrees.

Referring to FIGS. 15-17, an alternate embodiment of a loading system is shown at 30a. The same numerals have been used to refer to similar features as shown in corresponding figures above.

Loading system 30a includes a locking system 170 comprising a locking solenoid 172 that is adapted to limit the upwards travel of cover 70 to such an extent that it prevents any fluid from being ejected from the brewer if cover 70 is opened while fluid is being injected into capsule 16. A cover sensor switch 174 is used to ensure that cover 70 is fully closed before allowing the user to initiate a brew cycle. Locking solenoid 172 is engaged by a control system 190 (as shown in FIG. 18 and described further below) as soon as the user initiates a brew cycle and is not disengaged until the control system 190 determines that the brew cycle is completed or aborted. Cover sensor switch 174 is also used to detect when the user has opened cover 70 during a brew cycle, which will cause the control system 190 to abort the brew cycle and, after a short delay of 2-5 seconds, disengage locking solenoid 172.

Referring to FIG. 17, a sectional view of the brew chamber 14 portion of the loading system 30a is shown. The same numerals have been used to refer to similar features as shown in corresponding figures above.

Brew chamber 14 includes a nozzle pressure relief ball valve 180 and duck bill check valve 182 in communication with nozzle 80. Valves 180 and 182 are adapted to open when the pressure within nozzle 80 exceeds a predetermined amount (preferably around 7 psi). This may occur for instance if fluid is being injected into capsule 16 at a faster rate than fluid is being dispensed from capsule 16 through piercing probe 94 (due to a malfunction with piercing probe 94 for example).

Referring to FIG. 18, a schematic view of an alternate embodiment of fluid transfer system is shown at 100b. The same numerals have been used to refer to similar features as shown in corresponding FIGS. 10 and 11 above.

Fluid transfer system 100b includes nozzle pressure relief valve 180 and duck bill check valve 182 as discussed with reference to FIG. 17 above. The duck bill check valve 182 prevents any backflow of fluid and infusible materials (such as roast & ground coffee) into the brewer plumbing, which could impair the function (for example, by clogging of nozzle pressure relief valve 180). Nozzle pressure relief valve 180 relieves excess pressure from the system in the event flow is blocked or impeded at the injection nozzle, in the capsule or at the exit probe 94. Over-pressurization of the capsule is not desirable, as this could cause a failure of the capsule lid seal, leading to infusible material contaminating upper portions of the brew chamber, requiring significant cleaning effort by the user to return the machine to proper operation. Additional venting of excess pressure is provided at controlled brew valve 127 and pressure-relief valve 126 (preferably set at around 11 psi).

Fluid transfer system 100b further includes a control system 190 for controlling the operation of machine 10 including the timing and amount of fluid to be dispensed into capsule 16. The other embodiments of fluid transfer system 100 described above and shown in FIGS. 10 and 11 would include a similar form of control system 190.

As shown, control system 190 received inputs from machine components including fluid temperature and level sensors 110, 118 and 120 as well as from flowmeter 124. Control system also receives inputs from cover sensor switch 174 as well as from control interface 20 and brew button 186 (which may be a separate physical component on machine 10 or incorporated within control interface 20). Control system 190 transmits control commands to certain machine components based on inputs received and predetermined control logic such as the process logic described with reference to FIG. 19 below. As shown, control system 190 may transmit control commands to locking solenoid 172, inlet valve 106, heating element 116, fluid pumps 122 and 134, controlled brew valve 127 and air pump 136.

Control system 190 allows capsule 16 to be injected with fluid in pulsed intervals in order to optimize the extraction of solubles from infusible materials. One example of a system for controlling the injection of fluid into a capsule is described and shown in U.S. Pat. No. 7,047,870 the subject matter of which is incorporated in its entirety herein by reference.

The control system 190 will similarly adjust the timing & sequence of air injection into the capsule 16, injecting air simultaneously with the fluid and/or after the fluid injection. The pulsing sequence of the fluid and air is adjusted by the control system 190 to the optimal settings for the particular beverage type selected by the user. Pulsing is done using the fluid pumps 122 and 134 and air pump 136, with the timing being controlled by the control system 190 based on the beverage selected by the user and the amount of water injected as measured by the flowmeter 124. For example, the user may select a hot chocolate beverage on the control interface 20 and control system 190 would then control the operation of machine 10 in order to inject predetermined amounts of air and fluid simultaneously to create a desired beverage with froth. Different control operations would be implemented depending on the beverage selected by the user on the control interface 20. The control system 190 may also be adapted to control the strength of the desired beverage (such as coffee) according to user inputs by pausing the injection of fluid for a predetermined interval to allow optimized extraction. The control system 190 may also include a reader (not shown) adapted for reading an identification tag on the capsule (such as a barcode, microtag, RFID or other indicia) to identify relevant information concerning the capsule. Reader may then communicate with control system 190 in order to control operation of machine 10 based on the information identified by reader.

Referring to FIG. 19, a flow diagram is provided showing a process 200 implemented by control system 190 for preparing a beverage from a capsule 16 using machine 10 in accordance with one embodiment of the present invention.

Process 200 includes an initial step 202 of determining whether brew chamber 14 is closed based on inputs received from brewchamber sensor 174. If brew chamber 14 is not closed then process 200 will not proceed further. Process may optionally display a message on the control interface 20 indicating that brew chamber 14 is not closed.

Once brew chamber 14 is determined to be closed then process 200 proceeds to step 204 of displaying beverage selection options on control interface 20. Process then proceeds to step 206 where a user may optionally input desired beverage selections using control interface 20. Process 200 then proceeds to the next step 208 of prompting user to select the brew button on control interface 20. Upon actuation of brew button, process 200 proceeds to the next step 210 of determining whether the fluid temperature meets the requirements of the specific beverage selection based on inputs received from sensor 118.

If the temperature selection does not meet the specified requirements then process proceeds to step 212 of displaying on control interface 20 that fluid temperature is being adjusted. Typically, this involves heating fluid to a desired temperature. Once fluid is at the desired temperature then process 200 loops back to step 204 of displaying beverage selection options.

If step 210 determines that the temperature selection does meet the requirements of the specific beverage selection then process 200 proceeds to step 214 of opening controlled brew valve 127 and step 216 of activating pump 122 or 134 to pump a pre-determined amount of fluid for preparation of the selected beverage. Process 216 includes optional substep 218 of activating air pump 136 and/or fluid pumps 122 or 134 according to the beverage selection as well as optional substep 220 of pausing all pumps 122, 134 and 136 for a desired time period all in accordance with the beverage selection.

Process 200 further includes step 222 of determining the volume of fluid being pumped by pumps 122 and 134 based on inputs received from flow meter 124. If a predetermined amount of fluid has not been pumped during a predetermined time interval then process 200 proceeds to step 224 and deactivates fluid pumps 122 and 134 and displays an error message in control interface 20. If step 222 determines that a predetermined amount of fluid has been pumped during the time interval then process 200 proceeds to step 226 of deactivating fluid pumps 122 and 134 and activating air pump 136 for a predetermined time interval to clear any residual fluid within capsule 16. Process then proceeds to step 228 of displaying in control interface that beverage preparation is complete.

While the above description provides examples of one or more processes or apparatuses, it will be appreciated that other processes or apparatuses may be within the scope of the accompanying claims.

We claim:

1. A machine for preparing a product from a capsule that contains desired ingredients, the machine comprising:
   a housing;
   a brew chamber disposed in said housing, said brew chamber being adapted for holding a capsule at a downward angle relative to a horizontal plane for preparing a beverage;
   a cover adapted for covering said brew chamber, said cover being moveable between an open position, for loading or unloading a capsule, and a closed position for preparing a beverage;
   a loading mechanism adapted for extending said brew chamber away from said housing, for loading or unloading said capsule, and retracting said brew chamber toward said housing, for preparing said beverage;
   an injection system adapted for injecting a fluid into said capsule when said cover is in said closed position for preparing a beverage while said capsule is held in said brew chamber at said downward angle;
   a fluid transfer system adapted for transferring a desired fluid from a fluid source to said injection system; and
   a dispensing system adapted for dispensing product from said capsule to a desired receptacle.

2. The machine of claim 1, wherein said injection system includes an injection nozzle adapted to pierce a cover for said capsule, said injection nozzle being offset from a central axis of said brew chamber.

3. The machine of claim 2, wherein said injection nozzle includes a side opening for injecting fluid into said capsule in a direction that circulates around said central axis.

4. The machine of claim 2, wherein said injection nozzle includes a side opening for injecting fluid into said capsule in a direction towards said central axis.

5. The machine of claim 1, wherein said dispensing system comprises a probe adapted to pierce said capsule in said brew chamber at a lower most edge relative to a horizontal plane.

6. The machine of claim 1, wherein said downward angle is between 15 and 60 degrees.

7. The machine of claim 1, wherein said downward angle is between 25 and 35 degrees.

8. The machine of claim 1, wherein said loading mechanism comprises an arm mounted to a rail assembly disposed in said housing, said arm being adapted to support said brew chamber.

9. The machine of claim 8, wherein said loading mechanism further comprises a first lever pivotally secured at one end to said rail assembly and secured at another end to said arm by a link whereby movement of said cover between a closed position and an open position translates into movement of said arm from a retracted position proximate to said housing to an extended position away from said housing.

10. The machine of claim 9, wherein said injection system includes an injection nozzle adapted to pierce a cover for said capsule and wherein said first lever pivots while said arm remains stationary until said injection nozzle is fully withdrawn from said capsule.

11. The machine of claim 1, wherein said fluid transfer system includes a plurality of fluid sources, said fluid sources including at least one heated fluid supply.

12. The machine of claim 11, wherein said fluid sources include at least one ambient temperature fluid supply.

13. The machine of claim 11, wherein said fluid sources include at least one cooled fluid supply.

14. The machine of claim 11, wherein fluid from at least two of said plurality of fluid sources may be transferred to said injection nozzle for injection into said capsule.

15. The machine of claim 11, further comprising a control system for controlling said machine including said fluid transfer system, said control system being adapted to facilitate controlling the amount of fluid that is injected into said capsule.

16. The machine of claim 15, wherein said control system is further adapted to control the timing of said injection of fluid into said capsule in predetermined pulsed intervals.

17. The machine of claim 15, wherein said control system is further adapted to control the injection of air into said capsule from a source of air.

18. A machine for preparing a product from a capsule that contains desired ingredients, the machine comprising:
   a housing;
   a brew chamber disposed in said housing, said brew chamber being adapted for holding a capsule at a downward angle relative to a horizontal plane;
   a cover adapted for covering said brew chamber, said cover being moveable between an open position, for loading or unloading a capsule, and a closed position for preparing a beverage;
   a loading mechanism adapted for extending said brew chamber away from said housing, for loading or unloading said capsule, and retracting said brew chamber toward said housing, for preparing said beverage, wherein said loading mechanism comprises an arm mounted to a rail assembly disposed in said housing, said arm being adapted to support said brew chamber, and wherein said loading mechanism further comprises a first lever pivotally secured at one end to said rail assembly and secured at another end to said arm by a link whereby movement of said cover between a closed position and an open position translates into movement of said arm from a retracted position proximate to said housing to an extended position away from said housing;
   an injection system adapted for injecting a fluid into said capsule when said cover is in said closed position;
   a fluid transfer system adapted for transferring a desired fluid from a fluid source to said injection system; and
   a dispensing system adapted for dispensing product from said capsule to a desired receptacle.

19. The machine of claim 18, wherein said injection system includes an injection nozzle adapted to pierce a cover for said capsule and wherein said first lever pivots while said arm remains stationary until said injection nozzle is fully withdrawn from said capsule.

20. The machine of claim 18, wherein said injection system includes an injection nozzle adapted to pierce a cover for said capsule, said injection nozzle being offset from a central axis of said brew chamber.

21. The machine of claim 20, wherein said injection nozzle includes a side opening for injecting fluid into said capsule in a direction that circulates around said central axis.

22. The machine of claim 20, wherein said injection nozzle includes a side opening for injecting fluid into said capsule in a direction towards said central axis.

23. The machine of claim 18, wherein said dispensing system comprises a probe adapted to pierce said capsule in said brew chamber at a lower most edge relative to a horizontal plane.

24. The machine of claim 18, wherein said downward angle is between 15 and 60 degrees.

25. The machine of claim 18, wherein said downward angle is between 25 and 35 degrees.

26. The machine of claim 18, wherein said fluid transfer system includes a plurality of fluid sources, said fluid sources including at least one heated fluid supply.

27. The machine of claim 26, wherein said fluid sources include at least one ambient temperature fluid supply.

28. The machine of claim 26, wherein said fluid sources include at least one cooled fluid supply.

29. The machine of claim 26, wherein fluid from at least two of said plurality of fluid sources may be transferred to said injection nozzle for injection into said capsule.

30. The machine of claim 26, further comprising a control system for controlling said machine including said fluid transfer system, said control system being adapted to facilitate controlling the amount of fluid that is injected into said capsule.

31. The machine of claim 30, wherein said control system is further adapted to control the timing of said injection of fluid into said capsule in predetermined pulsed intervals.

32. The machine of claim 30, wherein said control system is further adapted to control the injection of air into said capsule from a source of air.

* * * * *